United States Patent
Sakamoto et al.

(10) Patent No.: US 12,436,082 B2
(45) Date of Patent: Oct. 7, 2025

(54) MICROCHIP, SAMPLE SORTING KIT, AND MICROPARTICLE SORTING DEVICE

(71) Applicant: Sony Group Corporation, Tokyo (JP)

(72) Inventors: Naohisa Sakamoto, Kanagawa (JP); Tatsumi Ito, Kanagawa (JP); Shinji Tashiro, Tokyo (JP); Nobuhiko Nishiki, Kanagawa (JP); Naohide Miyamoto, Kanagawa (JP); Kentaro Kuriyama, Kanagawa (JP); Kazuya Takahashi, Kanagawa (JP); Yoichi Katsumoto, Tokyo (JP); Atsushi Nakamura, Tokyo (JP)

(73) Assignee: Sony Group Corporation, Tokyo (JP)

( * ) Notice: Subject to any disclaimer, the term of this patent is extended or adjusted under 35 U.S.C. 154(b) by 702 days.

(21) Appl. No.: 17/776,983

(22) PCT Filed: Nov. 13, 2020

(86) PCT No.: PCT/JP2020/042361
§ 371 (c)(1),
(2) Date: May 13, 2022

(87) PCT Pub. No.: WO2021/100618
PCT Pub. Date: May 27, 2021

(65) Prior Publication Data
US 2022/0412870 A1 Dec. 29, 2022

(30) Foreign Application Priority Data

Nov. 20, 2019 (JP) .................. 2019-210029
Aug. 20, 2020 (JP) .................. 2020-139510

(51) Int. Cl.
*G01N 15/1404* (2024.01)
*G01N 15/14* (2024.01)
*G01N 15/149* (2024.01)

(52) U.S. Cl.
CPC ..... *G01N 15/1404* (2013.01); *G01N 15/1484* (2013.01); *G01N 2015/1415* (2013.01); *G01N 15/149* (2024.01)

(58) Field of Classification Search
CPC .......... G01N 15/1404; G01N 15/1484; G01N 15/149; B01L 3/5027
See application file for complete search history.

(56) References Cited

U.S. PATENT DOCUMENTS

| | | | |
|---|---|---|---|
| 6,767,733 B1 | 7/2004 | Green | |
| 9,018,556 B2 * | 4/2015 | Ito .................. | G01N 15/1484 209/932 |

(Continued)

FOREIGN PATENT DOCUMENTS

| | | |
|---|---|---|
| CN | 102998242 A | 3/2013 |
| CN | 103586221 A | 2/2014 |

(Continued)

OTHER PUBLICATIONS

International Search Report and English translation thereof mailed Jan. 19, 2021 in connection with International Application No. PCT/JP2020/042361.

(Continued)

*Primary Examiner* — Michael McCullough
*Assistant Examiner* — Jessica L Burkman
(74) *Attorney, Agent, or Firm* — Wolf, Greenfield & Sacks, P.C.

(57) ABSTRACT

To provide a microchip that is easily handled.
Provided is a microchip having a plate shape and including: a sample liquid inlet into which a sample liquid is introduced; a main flow path through which the sample liquid introduced from the sample liquid inlet flows; and a sorting flow path into which a target sample is sorted from the sample liquid, in which the sample liquid inlet and a (Continued)

terminal end of the sorting flow path are formed on a same side surface. Furthermore, a sample sorting kit including the microchip is also provided. Moreover, a microparticle sorting device on which the microchip is mounted is also provided.

17 Claims, 22 Drawing Sheets

(56) References Cited

U.S. PATENT DOCUMENTS

| | | | | |
|---|---|---|---|---|
| 10,585,023 | B2* | 3/2020 | Broyer | B01L 3/502753 |
| 11,579,073 | B2* | 2/2023 | Nassef | B01L 3/502715 |
| 2009/0283148 | A1 | 11/2009 | Shinoda et al. | |
| 2010/0123457 | A1 | 5/2010 | Shinoda | |
| 2011/0008817 | A1* | 1/2011 | Durack | B01L 3/502715 |
| | | | | 435/29 |
| 2012/0153185 | A1 | 6/2012 | Ito | |
| 2015/0024373 | A1 | 1/2015 | Xia | |
| 2015/0114093 | A1* | 4/2015 | Appleyard | B01L 3/502761 |
| | | | | 73/61.59 |
| 2017/0128940 | A1 | 5/2017 | Amini | |
| 2018/0149566 | A1 | 5/2018 | Nakano | |
| 2018/0306697 | A1 | 10/2018 | Kishima | |

FOREIGN PATENT DOCUMENTS

| | | |
|---|---|---|
| CN | 105874316 A | 8/2016 |
| CN | 107051911 A | 8/2017 |
| CN | 108367291 A | 8/2018 |
| JP | 2005-274199 A | 10/2005 |
| JP | 2010-054492 A | 3/2010 |
| JP | 2010-151777 A | 7/2010 |
| JP | 2012-127922 A | 7/2012 |
| JP | 2017-504037 A | 2/2017 |
| JP | 2017-083263 A | 5/2017 |
| WO | WO 2019/098126 A1 | 5/2019 |

OTHER PUBLICATIONS

International Written Opinion and English translation thereof mailed Jan. 19, 2021 in connection with International Application No. PCT/JP2020/042361.

International Preliminary Report on Patentability and English translation thereof mailed Jun. 2, 2022 in connection with International Application No. PCT/JP2020/042361.

Extended European Search Report issued Dec. 7, 2022 in connection with European Application No. 20889868.4.

* cited by examiner

MICROCHIP, SAMPLE SORTING KIT, AND MICROPARTICLE SORTING DEVICE

CROSS-REFERENCE TO RELATED APPLICATIONS

This application claims the benefit under 35 U.S.C. § 371 as a U.S. National Stage Entry of International Application No. PCT/JP2020/042361, filed in the Japanese Patent Office as a Receiving Office on Nov. 13, 2020, which claims priority to Japanese Patent Application Number JP2020-139510, filed in the Japanese Patent Office on Aug. 20, 2020 and Japanese Patent Application Number JP2019-210029, filed in the Japanese Patent Office on Nov. 20, 2019, each of which is hereby incorporated by reference in its entirety.

TECHNICAL FIELD

The present technology relates to a microchip, a sample sorting kit, and a microparticle sorting device. More specifically, the present invention relates to a microchip that is easily handled, a sample sorting kit including the microchip, and a microparticle sorting device on which the microchip is mounted.

BACKGROUND ART

Various devices have been developed so far for sorting microparticles. For example, in a microparticle sorting system used in a flow cytometer, a laminar flow including a sample liquid containing microparticles and a sheath liquid is discharged from an orifice formed in a flow cell or a microchip. At the time of discharging, a predetermined vibration is applied to the laminar flow to form droplets. A moving direction of the formed droplets is electrically controlled depending on whether or not target microparticles are contained, and the target microparticles can be sorted.

A technique for sorting target microparticles in a microchip without forming droplets as described above has also been developed. For example, Patent Document 1 below describes "a microchip comprising: a sample liquid feed channel for permitting a sample liquid containing at least a particulate to flow through; at least one pair of sheath liquid feed channels configured to merge to the sample liquid feed channel from both sides thereof for permitting a sheath liquid to flow through surrounding the sample liquid; a merging flow path connected to the sample liquid feed channel and the at least one pair of the sheath liquid feed channels, for permitting the sample liquid and the sheath liquid to merge and flow through the merging flow path; a vacuum suction unit connected to the merging flow path, for absorbing and drawing into the particulate subject to collection; and at least one pair of discharge channels formed on both sides of the vacuum suction unit for permitting to flow through from the merging flow path" (claim 1). In the microchip, the target microparticles are collected by absorbing to the vacuum suction unit.

CITATION LIST

Patent Document

Patent Document 1: Japanese Patent Application Laid-Open No. 2012-127922

SUMMARY OF THE INVENTION

Problems to be Solved by the Invention

In a structure of a conventional microchip, a sample liquid inlet into which a sample liquid containing microparticles is introduced and a terminal end of a sorting flow path into which microparticles that should be collected from the sample liquid have been sorted are formed on different side surfaces. As a result, at a time when inserting the microchip into a device or the like, it is necessary to install a collection container, a bag, or the like on a side corresponding to each side surface.

Therefore, a main object of the present technology is to provide a microchip that is easily handled.

Solutions to Problems

The present inventors have found that the problem described above can be solved by a microchip having a specific configuration.

That is, the present technology provides a microchip having a plate shape and including: a sample liquid inlet into which a sample liquid is introduced; a main flow path through which the sample liquid introduced from the sample liquid inlet flows; and a sorting flow path into which a target sample is sorted from the sample liquid, in which the sample liquid inlet and a terminal end of the sorting flow path are formed on a same side surface.

The microchip according to the present technology may further include a sheath liquid inlet into which a sheath liquid is introduced, and the sheath liquid inlet may be formed on the same side surface. In this case, a buffer liquid inlet into which a buffer liquid is introduced may be further provided, and the buffer liquid inlet may be formed on the same side surface. Furthermore, in this case, a branch flow path that branches from the main flow path and into which a sample other than a target sample is discarded may be further included, and a terminal end of the branch flow path may be formed on the same side surface.

Furthermore, in the microchip according to the present technology, a flow path connecting member may be inserted into at least one or more selected from a group including the sample liquid inlet, a terminal end of the sorting flow path, the sheath liquid inlet, the buffer liquid inlet, and a terminal end of the branch flow path. In this case, a protection unit that protects the inserted flow path connecting member may be provided. Furthermore, in this case, a sample liquid flow path through which the sample liquid flows may have an abrupt expanding part having a cross-sectional area larger than a cross-sectional area of an inner diameter of the flow path connecting member, at an end on the sample liquid inlet side.

Moreover, the microchip according to the present technology may further include an orifice part coaxial with the main flow path and connected to the sorting flow path, and a side wall of the sorting flow path on a side connected to the orifice part may have at least one or more curvatures. In this case, a cross-sectional area of the sorting flow path may continuously increase along a traveling direction of a liquid flow up to a predetermined position. In this case, a side wall of the sorting flow path on the side connected to the orifice part may have two different curvatures. In this case, the sorting flow path may have a constant depth up to the second curvature portion, and a width up to the second curvature portion may continuously increase along the traveling direction of the liquid flow. In this case, in the sorting flow path, a depth after the second curvature portion may continuously increase along the traveling direction of the liquid flow.

In addition, the sorting flow path and the orifice part may be formed in a substrate layer that is laminated, and a part of the sorting flow path and/or a part of the orifice part may be formed in a layer on one side of the substrate layer.

Furthermore, in the microchip according to the present technology, at least a part of one surface of the substrate layer in which the sorting flow path is formed may be exposed outside.

Moreover, the main flow path may have a first optical detection region, and both surfaces of the substrate layer in which the first optical detection region is formed may be exposed outside.

In addition, the sorting flow path may have a second optical detection region, and both surfaces of the substrate layer in which the second optical detection region is formed may be exposed outside.

Furthermore, the present technology also provides a sample sorting kit including: a sample liquid accommodation unit that accommodates a sample liquid; and a microchip having a plate shape and including a sample liquid inlet into which a sample liquid is introduced, a main flow path through which the sample liquid introduced from the sample liquid inlet flows, and a sorting flow path into which a target sample is sorted from the sample liquid in which the sample liquid inlet and a terminal end of the sorting flow path are formed on a same side surface, in which the sample liquid accommodation unit and the microchip are connected.

Moreover, the present technology also provides a microparticle sorting device mounted with a microchip having a plate shape, the microchip including: a sample liquid inlet into which a sample liquid is introduced; a main flow path through which the sample liquid introduced from the sample liquid inlet flows; and a sorting flow path into which a target sample liquid is sorted from the sample liquid, in which the sample liquid inlet and a terminal end of the sorting flow path are formed on a same side surface.

A microparticle sorting device according to the present technology may include: a chip insertion unit into which the microchip is inserted; a light irradiation unit configured to irradiate a microparticle flowing through the main flow path with light; a light detection unit configured to detect scattered light and/or fluorescence emitted from the microparticle; and a control unit configured to control a traveling direction of a microparticle flowing through the main flow path on the basis of data detected by the light detection unit.

Furthermore, the microparticle sorting device according to the present technology may include: a sample liquid accommodation unit that accommodates the sample liquid; and a sample sorting kit in which the sample liquid accommodation unit and the microchip are connected, and the microparticle sorting device may further include a sample liquid feeding mechanism configured to feed a sample from the sample liquid accommodation unit to the microchip.

MODE FOR CARRYING OUT THE INVENTION

Figure 1:
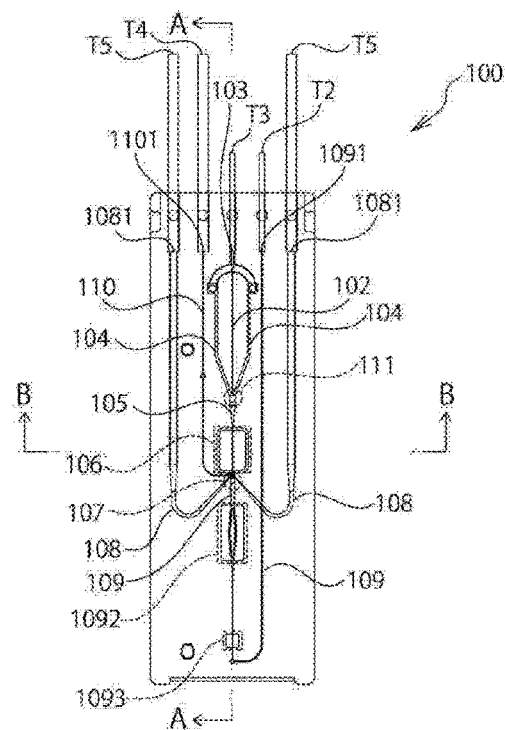
FIG. 1 is a front view illustrating a first embodiment of a microchip according to the present technology.
Figure 2:
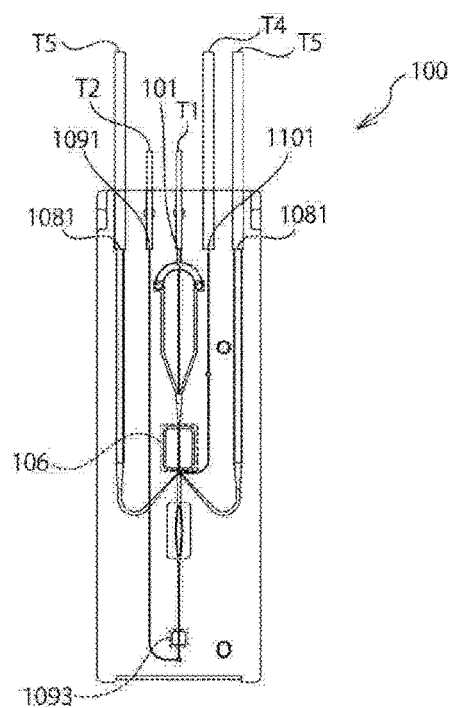
FIG. 2 is a rear view illustrating the first embodiment of the microchip according to the present technology.
Figure 3:
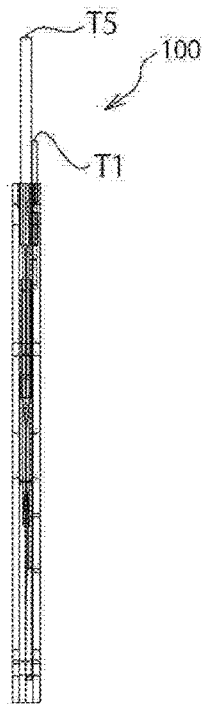
FIG. 3 is a left side view illustrating the first embodiment of the microchip according to the present technology.
Figure 4:
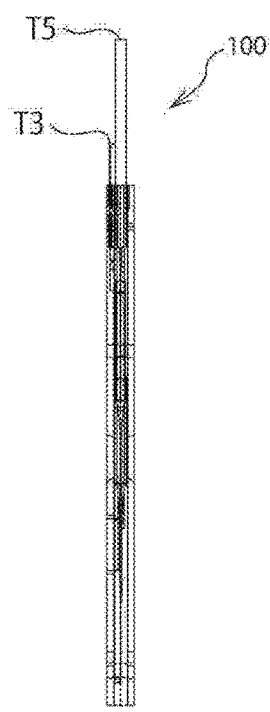
FIG. 4 is a right side view illustrating the first embodiment of the microchip according to the present technology.
Figure 5:
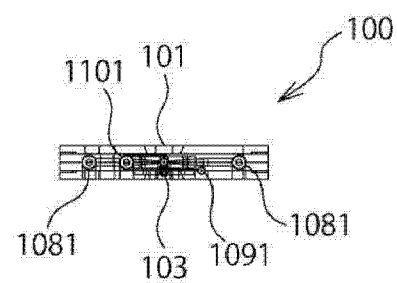
FIG. 5 is a plan view illustrating the first embodiment of the microchip according to the present technology.
Figure 6:
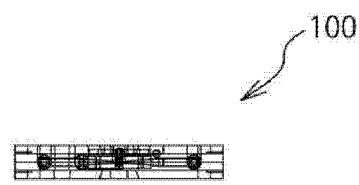
FIG. 6 is a bottom view illustrating the first embodiment of the microchip according to the present technology.
Figure 7:
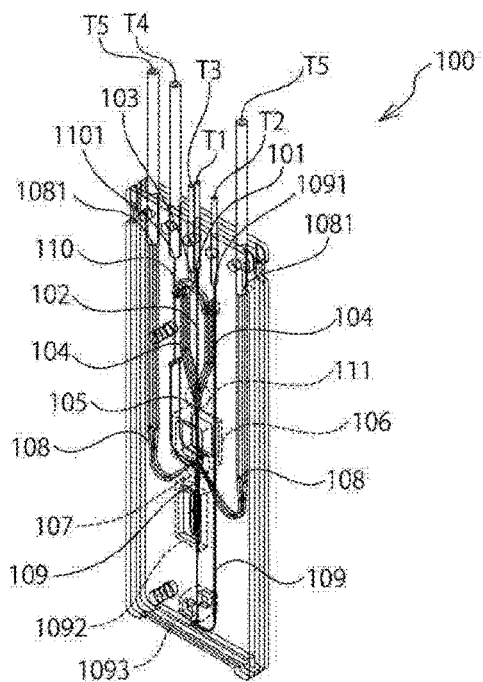
FIG. 7 is a front-side perspective view illustrating the first embodiment of the microchip according to the present technology.
Figure 8:
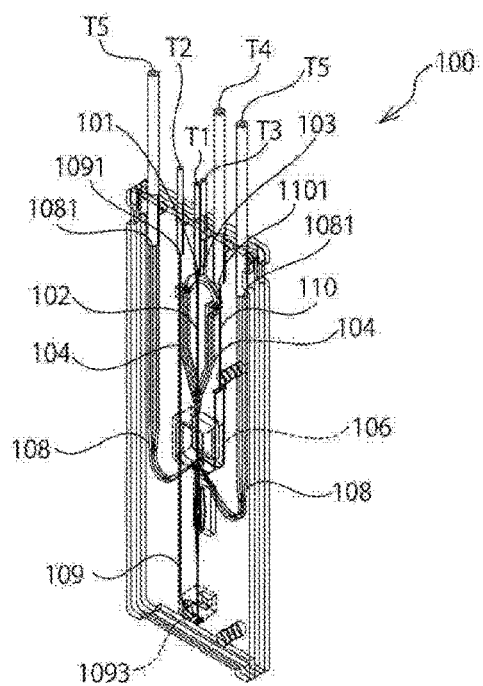
FIG. 8 is a rear-side perspective view illustrating the first embodiment of the microchip according to the present technology.
Figure 9:
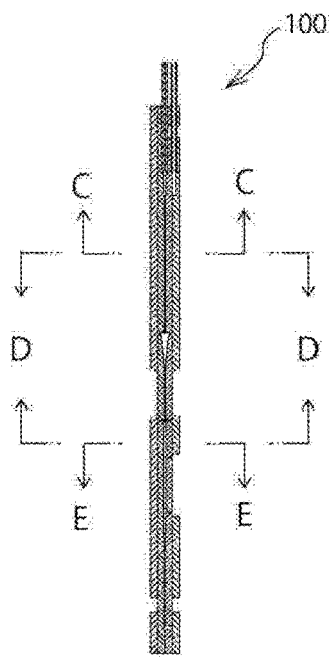
FIG. 9 is an A-A line end view of FIG. 1 illustrating the first embodiment of the microchip according to the present technology.
Figure 10:
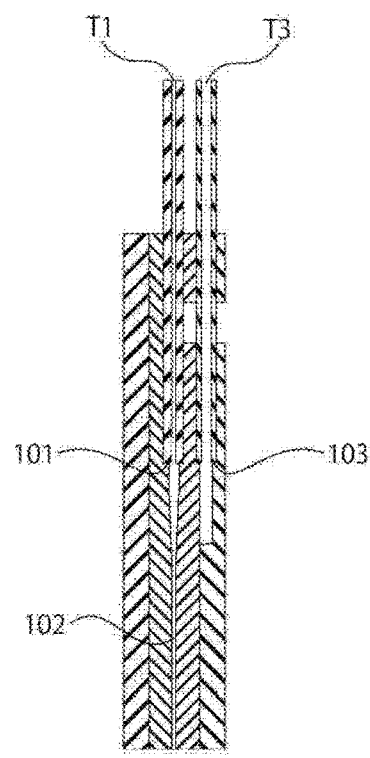
FIG. 10 is a partially enlarged view between C and C in FIG. 9.

Hereinafter, a preferred mode for implementing the present technology will be described.

Note that the embodiments described below show a representative embodiment of the present technology, and do not cause the scope of the present technology to be narrowly interpreted. The present technology will be described in the following order.

1. First embodiment (microchip)
2. Second embodiment (microchip)
3. Third embodiment (microchip)
4. Fourth embodiment (sample sorting kit)
5. Fifth embodiment (microparticle sorting device)

1. First Embodiment (Microchip)

FIGS. 1 to 14 are views illustrating a first embodiment of a microchip 100 according to the present technology.

Hereinafter, a configuration of the microchip 100 according to the present embodiment will be described. Note that the embodiment illustrates a preferred example, and the microchip 100 according to the present technology is not limited to the configuration.

The microchip 100 according to the present embodiment may have a flow path structure as illustrated in FIGS. 1 to 14. In the microchip 100 according to the present embodiment, a sample liquid inlet 101 and a terminal end 1091 of a sorting flow path 109 are formed on a same side surface. As a result, when the microchip 100 is inserted into a device (for example, a microparticle sorting device 300 to be described later or the like), the microchip can be easily inserted and removed. Furthermore, when a flow path connecting member is inserted into each of the sample liquid inlet 101 and the terminal end 1091 of the sorting flow path 109, pipes can be integrated in one direction, so that the chip can be easily handled.

Furthermore, the microchip 100 is provided with the sample liquid inlet 101 into which a sample liquid is introduced, and a sheath liquid inlet 103 into which a sheath liquid is introduced. In the present embodiment, the sheath liquid inlet 103 is formed on the same side surface as the sample liquid inlet 101 and the terminal end 1091 of the sorting flow path 109. This configuration can prevent handling of the microchip from becoming complicated.

From the sample liquid inlet 101 and the sheath liquid inlet 103, the sample liquid and the sheath liquid are introduced into a sample liquid flow path 102 and a sheath liquid flow path 104, respectively. This sample liquid contains microparticles.

In the present technology, the sample liquid is not particularly limited as long as it is a specimen containing a target sample that may be sorted using the microchip 100 according to the present technology. Examples thereof include, for example, whole blood, a liquid containing patient-derived cells such as peripheral blood mononuclear cells contained in whole blood and a cell suspension containing only lymphocytes, and the like.

The sheath liquid flowing through the sheath liquid flow path 104 merges with the sample liquid flowing from both sides of the sample liquid flow path 102 at a merging part 111, to form a laminar flow in which a periphery of the sample liquid is surrounded by the sheath liquid. The laminar flow flows through a main flow path 105 toward a particle sorting unit 107.

The main flow path 105 includes a first optical detection region 106. In the first optical detection region 106, a microparticle in the sample liquid is irradiated with light. On the basis of fluorescence and/or scattered light generated by the irradiation of light, it may be determined whether a microparticle should be collected. In the present embodiment, both surfaces of the substrate layer in which the first optical detection region 106 is formed are exposed outside. This configuration enables detection by a light detection unit 303 described later.

Figure 11:
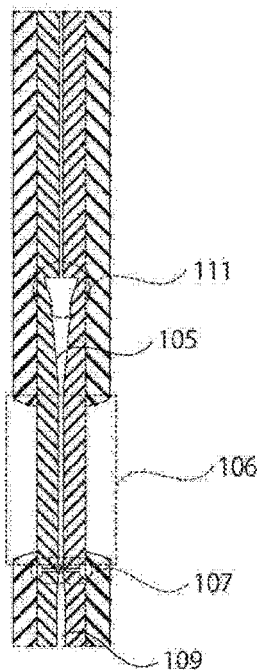
FIG. 11 is a partially enlarged view between D and D in FIG. 9.

Furthermore, in this case, in particular, the first optical detection region 106 may have a tapered shape in a part of a wall forming the region as illustrated in FIG. 11. This configuration makes it possible to avoid optical vignetting. A taper angle may be, for example, 5° or more and 30° or less, preferably 10° or more and 25° or less, and particularly preferably 15° or more and 20° or less. This configuration makes it possible to prevent bonding of a substrate layer forming the microchip 100 from being affected. Furthermore, the first optical detection region 106 and an excitation region 1092 to be described later may be arranged close to each other.

In the present technology, one position in the first optical detection region 106 may be irradiated with one light beam, or each of a plurality of positions in the first optical detection region 106 may be irradiated with light. For example, the microchip 100 may be configured such that each of two different positions in the first optical detection region 106 is irradiated with light. That is, there may be two positions irradiated with light in the first optical detection region 106. In this case, for example, whether or not the microparticle should be collected may be determined on the basis of light (for example, fluorescence and/or scattered light, or the like) generated by irradiating the microparticle with light at one position. Moreover, on the basis of a difference between a detection time of light generated by the light irradiation at the one position and a detection time of light generated by light irradiation at another position, a speed of the microparticle in the flow path can also be calculated. For the calculation, a distance between two irradiation positions may be determined in advance, and the speed of the microparticle may be determined on the basis of a difference between the two detection times and the distance. Moreover, it is possible to accurately predict an arrival time at the particle sorting unit 107 described below on the basis of the speed. By accurately predicting the arrival time, it is possible to optimize a timing of forming a flow entering the sorting flow path 109. Furthermore, in a case where a difference between an arrival time of a certain microparticle at the particle sorting unit 107 and an arrival time of a microparticle before or after the certain microparticle at the particle sorting unit 107 is equal to or less than a predetermined threshold value, it can also be determined not to sort the certain microparticle. In a case where a distance between the certain microparticle and a microparticle before or after the certain microparticle is narrow, there is a high possibility that the microparticle before or after is collected together when the certain microparticle is suctioned. In a case where there is a high possibility of being collected together, the collection of the microparticle before or after can be prevented by determining not to sort the certain bioparticle. As a result, a purity of the target microparticle among the collected microparticles can be increased. A specific example of a microchip in which light is emitted to each of two different positions in the first optical detection region 106 and a device including the microchip is described in, for example, Japanese Patent Application Laid-Open No. 2014-202573.

In the particle sorting unit 107 in the microchip 100, the laminar flow flowing through the main flow path 105 separately flows into two branch flow paths 108. Note that the particle sorting unit 107 in the embodiment illustrated in FIGS. 1 to 14 has the two branch flow paths 108, but the number of branch flow paths is not limited to two. That is, the particle sorting unit 107 may be provided with, for example, one or a plurality of (for example, such as two, three, or four) branch flow paths.

In the present technology, as illustrated in FIGS. 1 to 14, the branch flow path 108 may be formed to branch in a Y shape on a plane and then extended toward a side-surface side on which the sample liquid inlet 101 and the terminal end 1091 of the sorting flow path 109 are located, or may be configured to branch three-dimensionally.

In the present embodiment, a terminal end 1081 of the branch flow path 108 is formed on the same side surface as the sample liquid inlet 101 and the terminal end 1091 of the sorting flow path 109. This configuration makes it possible to improve handling of the chip, and for example, it is possible to prevent complication of an operation at a time of inserting the chip into the device, and the like.

In the particle sorting unit 107, only in a case where a microparticle (also referred to as a "target sample") that should be collected flows, a flow entering the sorting flow path 109 is formed, and the microparticle is collected. The flow entering the sorting flow path 109 may be formed, for example, by generating a negative pressure in the sorting flow path 109. In order to generate the negative pressure, as in the present embodiment, the excitation region 1092 is provided, and an actuator or the like may be attached to the outside of the microchip 100 so that a wall of the region may be deformed.

In the present embodiment, one surface of the substrate layer in which the excitation region 1092 is formed may be exposed outside. By exposing only one surface to the outside in this manner, rigidity of the microchip 100 itself can be increased, and unnecessary vibration can be reduced. Similarly to the first optical detection region 106 described above, the excitation region 1092 may have a tapered shape in a part of a wall forming the region. By the deformation of the wall of the region, an inner space of the excitation region 1092 is changed, and a negative pressure may be generated.

The actuator may be, for example, a piezo actuator. When the microparticle is suctioned into the sorting flow path 109, the sample liquid included in the laminar flow or the sample liquid and the sheath liquid included in the laminar flow may also flow into the sorting flow path 109. In this way, microparticles that should be collected may be collected.

Figure 15:
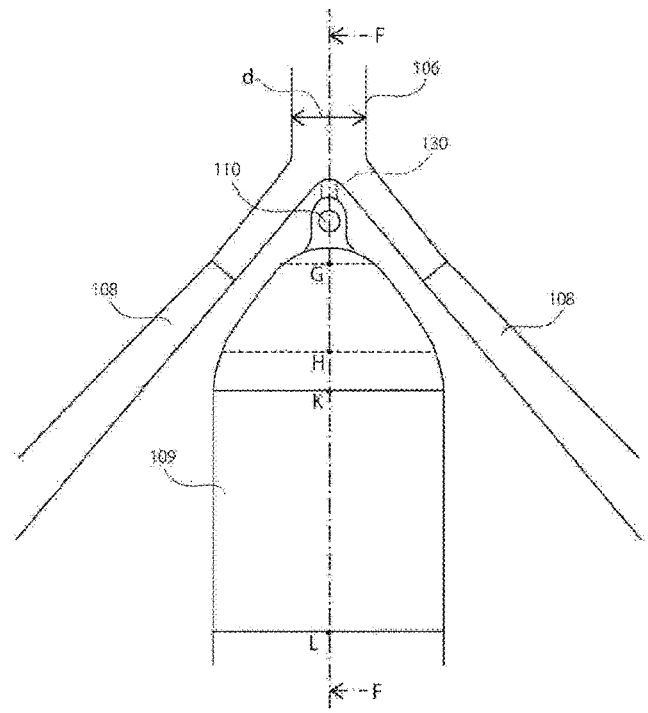
FIG. 15 is a schematic cross-sectional view illustrating an example of the vicinity of a particle sorting unit.

FIG. 15 is a schematic cross-sectional view (a plane parallel to a front surface) illustrating an example of the vicinity of the particle sorting unit 107. As illustrated in FIG. 15, the main flow path 105 and the sorting flow path 109 communicate with each other via an orifice part 130 coaxial with the main flow path 105. The microparticle that should be collected flows through the orifice part 130 to the sorting flow path 109. Furthermore, in order to prevent entry of microparticles that should not be collected into the sorting flow path 109 through the orifice part 130, a buffer liquid flow path 110 may be provided in the orifice part 130. When a buffer liquid is introduced from the buffer liquid flow path 110, and a flow from the orifice part 130 toward the main flow path 105 is formed by a part of the introduced buffer liquid, entry of the microparticle that should not be collected into the sorting flow path 109 is prevented.

A buffer liquid inlet 1101 into which the buffer liquid is introduced is formed on the same side surface as the sample liquid inlet 101 and the terminal end 1091 of the sorting flow path 109. This configuration makes it possible to improve handling of the chip, and for example, it is possible to prevent complication of an operation at a time of inserting the chip into the device, and the like. Note that the rest of the introduced buffer liquid may flow to the sorting flow path 109.

Figure 17:
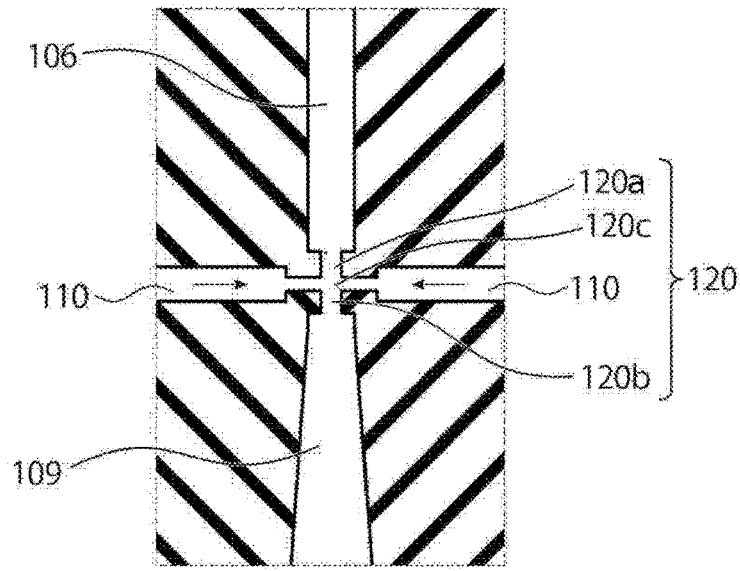
FIG. 17 is a schematic longitudinal cross-sectional view illustrating an example of the vicinity of an orifice part.

FIG. 17 is a schematic longitudinal cross-sectional view illustrating an example of the vicinity of an orifice part 120. Note that the cross-sectional view is a schematic cross-sectional view in a plane passing through a center line of the buffer liquid flow path 110 and a center line of the orifice part 120. The orifice part 120 includes: a flow path 120*a* (hereinafter, also referred to as an "upstream-side orifice flow path 120*a*") on the first optical detection region 106 side; a flow path 120*b* (hereinafter, also referred to as a "downstream-side orifice flow path 120*b*") on the sorting flow path 109 side; and a connecting part 120*c* between the orifice part 120 and the buffer liquid flow path 110. In the present embodiment, the buffer liquid flow path 110 is provided so as to be substantially perpendicular to an axis of a flow path of the orifice part 120. In this case, a space in the vicinity of the orifice part 120 can be sufficiently secured, a thickness of a flow path wall can be maintained since individual flow paths are not adjacent to each other, and a bonding area of a chip bonding surface can be increased. Therefore, it is advantageous in terms of mechanical strength. In FIG. 17, two buffer liquid flow paths 110 are provided so as to face each other at substantially a center position of the orifice part 120, but only one buffer liquid flow path may be provided.

In the present technology, various liquids can be selected as the buffer liquid depending on use. For example, it is possible to select a liquid corresponding to the microparticle, such as a liquid medium used for a microparticle-containing liquid, a sheath liquid, a buffer liquid containing a surfactant and having adjusted pH or the like in a case where the microparticle is a protein, or the like. In particular, in a case where the microparticle is a cell, a cell culture solution, a cell preservative solution, or the like can be used. In a case of using a cell culture solution, it is suitable for a case of performing a next step to be applied to the target sample, for example, performing a step such as cell culture, cell activation, or gene introduction. In a case of using a cell preservation solution, it is suitable for a case of storing and transporting collected cells. Furthermore, in a case where the target sample is undifferentiated cells such as iPS cells, a differentiation-induction solution can be used, which makes it possible to efficiently proceed with the next work. Furthermore, as the buffer liquid, a solution having a blocking effect can also be used. As a result, it becomes possible to suppress nonspecific adsorption of the target sample to a collection container or a bag. Examples of a blocking agent include, for example, a solution containing a protein such as albumin, a solution containing an amino acid such as glycine, and a solution containing a nonionic surfactant such as Pluronic F68. Moreover, as the buffer liquid, a solution having a cytolytic action, or the like, can also be used. As a result, it becomes possible to extract an intracellular substance as it is after sorting a target sample group. Examples of a cell lysate include, for example, a solution containing a surfactant.

Note that, similarly, various liquids can be selected for the sheath liquid in the present technology. In the present specification, a liquid flowing through the buffer liquid flow path 110 is referred to as a "buffer liquid".

In the present technology, a shape and a dimension of a cross section of the upstream-side orifice flow path 120a may be the same as a shape and a dimension of the downstream-side orifice flow path 120b. For example, both the cross section of the upstream-side orifice flow path 120a and the cross section of the downstream-side orifice flow path 120b may be substantially circular having the same dimension. Alternatively, both of these two cross sections may be rectangular (for example, a square, a rectangle, or the like) having the same dimension.

Figure 18:
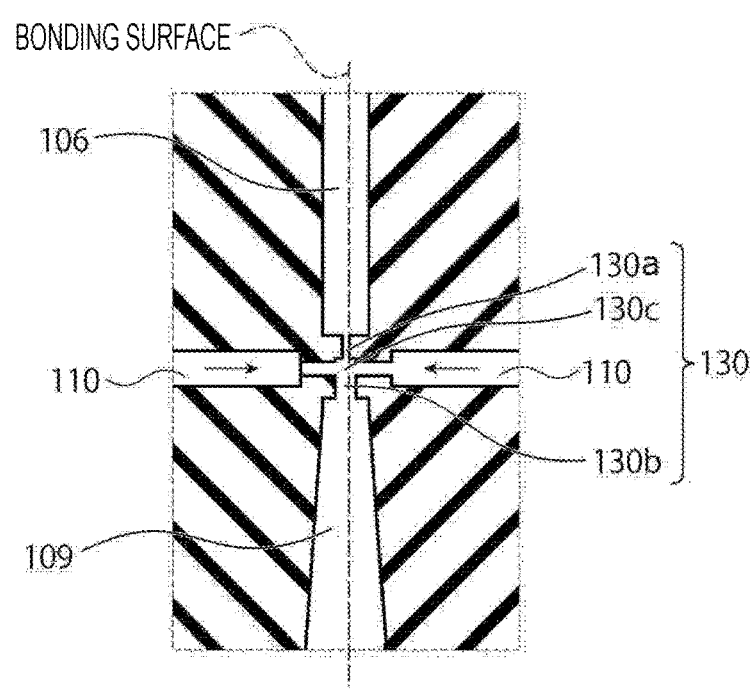
FIG. 18 is a schematic longitudinal cross-sectional view illustrating an example of the vicinity of an orifice part different from FIG. 17.

Furthermore, in the present technology, a shape and/or a dimension of the cross section of the upstream-side orifice flow path 120a may be different from a shape and/or a dimension of the downstream-side orifice flow path 120b. An example in which the dimensions of these two flow paths are different is illustrated in FIG. 18. As illustrated in FIG. 18, a flow path 130a (hereinafter, also referred to as an "upstream-side orifice flow path 130a") on the first optical detection region 106 side, a flow path 130b (hereinafter, also referred to as a "downstream-side orifice flow path 130b") on the sorting flow path 109 side, and the orifice part 130 include a connecting part 130c between the orifice part 130 and the buffer liquid flow path 110. Both a cross section of the upstream-side orifice flow path 130a and a cross section of the downstream-side orifice flow path 130b have a substantially circular shape, but a diameter of the latter cross section can be made larger than a diameter of the former cross section. By making the diameter of the latter cross section larger than the former cross section, as compared with a case where both diameters are the same, it is possible to more effectively prevent discharging of microparticles already sorted in the sorting flow path 109 immediately after the microparticle sorting operation by the negative pressure described above, to the main flow path 105 through the orifice part 130. For example, in a case where the cross section of the upstream-side orifice flow path 130a and the cross section of the downstream-side orifice flow path 130b are both rectangular, by making an area of the latter cross section larger than an area of the former cross section, as described above, it is possible to more effectively prevent discharging of the already collected microparticles, to the main flow path 105 through the orifice part 130.

In the present embodiment, a part of the orifice part 130 may be formed on a substrate layer on one side as illustrated in FIG. 18. As a result, in a case where the microchip 100 is formed by bonding a plurality of substrate layers, an influence of bonding misalignment can be reduced.

Figure 12:
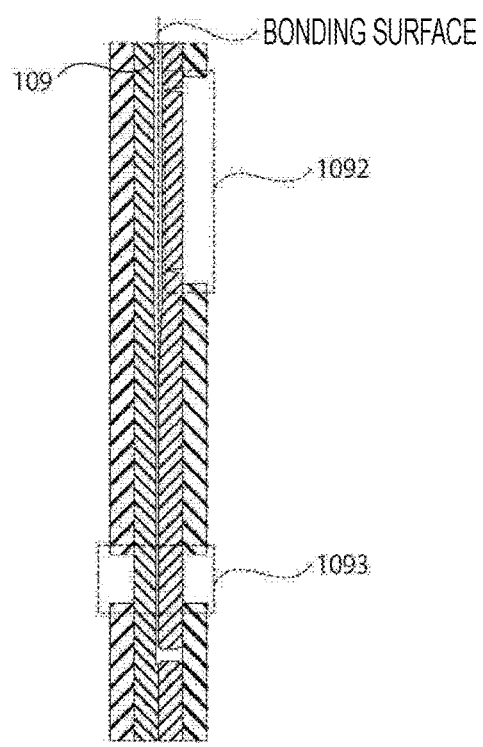
FIG. 12 is a partially enlarged view between E and E in FIG. 9.
Figure 13:
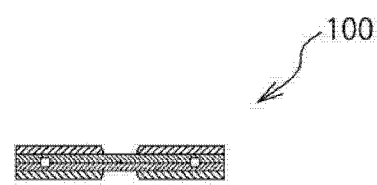
FIG. 13 is a B-B line end view of FIG. 1 illustrating the first embodiment of the microchip according to the present technology.
Figure 14:
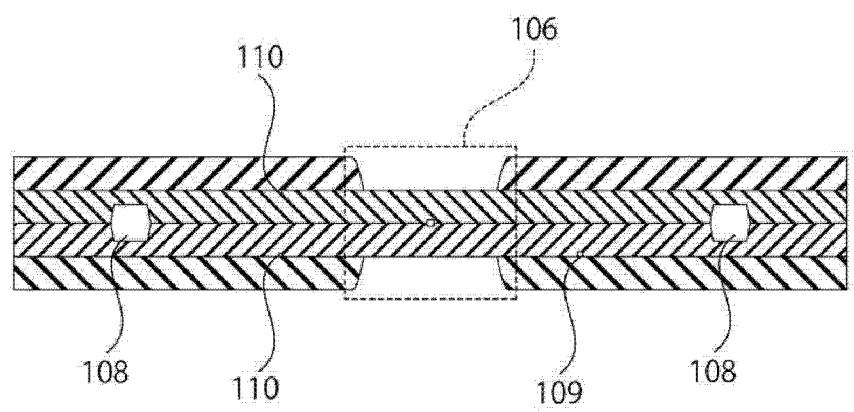
FIG. 14 is an enlarged view of FIG. 13.

Furthermore, in particular, a part of the sorting flow path 109 may also be formed in a substrate layer on one side as illustrated in FIG. 12. In particular, a structure of bringing closer to the substrate layer side to which the orifice part 130 is brought closer may be adopted. As a result, it is possible to reduce an influence of an edge of the sorting flow path 109 on deteriorating signal characteristics.

Figure 16:
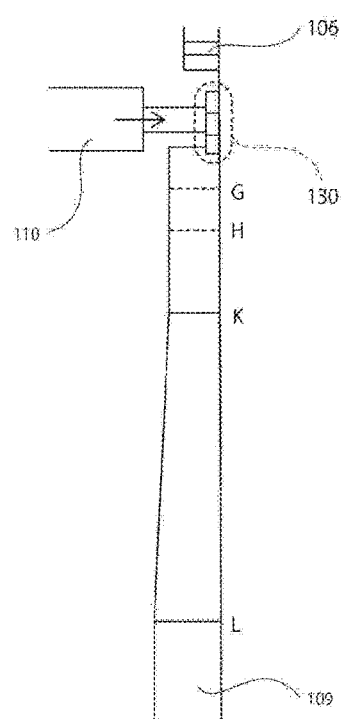
FIG. 16 is an F-F line end view of FIG. 15.

FIG. 16 is an F-F line end view of FIG. 15. In the present embodiment, as illustrated in FIG. 15, a side wall of the sorting flow path 109 on a side connected to the orifice part 130 may have at least one or more curvatures. This is because, in a case where no curvature is provided, a distance between the orifice part 130 and the excitation region 1092 of the sorting flow path 109 becomes short, a design restriction on the device side occurs, and there arises a problem that a member (for example, an objective lens or the like) constituting the light detection unit 303 and an actuator or the like interfere with each other, and one of them cannot be arranged.

Moreover, as illustrated in FIGS. 15 and 16, a cross-sectional area of the sorting flow path 109 may continuously increase along a traveling direction of a liquid flow up to a predetermined position (see, a point K in FIGS. 15 and 16). As a result, it is possible to increase a flow speed in the vicinity of the orifice part 130 and improve sorting accuracy.

Furthermore, the side wall of the sorting flow path 109 particularly has two different curvatures. In this case, in particular, a first curvature in the traveling direction of the liquid flow (see, a point G in FIGS. 15 and 16) may be smaller than a second curvature in the traveling direction (see, a point H in FIGS. 15 and 16). For example, the first curvature may be φ1 mm or less and preferably φ0.5 mm or less, and the second curvature may be φ0.1 mm or more and preferably φ 0.3 mm or more. As described above, since the side wall of the sorting flow path 109 has two different curvatures, a pressure loss and advection in the vicinity of the orifice part 130 can be reduced, and the sorting accuracy can be improved.

As illustrated in FIGS. 15 and 16, the sorting flow path 109 has a constant depth up to the second curvature portion (see, the point H in FIGS. 15 and 16), and a width up to the second curvature portion may continuously increase along the traveling direction of the liquid flow. As a result, it is possible to increase a flow speed in the vicinity of the orifice part 130 and improve sorting accuracy.

Furthermore, in the sorting flow path 109, after the second curvature portion (see, the point H in FIGS. 15 and 16), the depth continuously increases to a predetermined position (the point K in FIGS. 15 and 16) along the traveling direction of the liquid flow. As a result, a pressure loss and advection in the vicinity of the orifice part 130 can be reduced, and the sorting accuracy can be improved.

Moreover, in the sorting flow path 109, the depth may continuously increase along the traveling direction of the liquid after the predetermined position, and the width may be constant to the second predetermined position (see, a point L in FIG. 16), or the width may also increase continuously along the traveling direction of the liquid.

As described above, in the present embodiment, by devising the flow path shape immediately after the orifice part 130, it is possible to increase a distance between the orifice part 130 and particularly the excitation region 1092 in the sorting flow path 109 without impairing the sorting characteristics, and it is possible to reduce restrictions on the device side.

A laminar flow having flowed into the branch flow path 108 may be discharged to the outside of the microchip 100 at the terminal end 1081 of the branch flow path 108. Furthermore, the microparticles collected into the sorting flow path 109 may be discharged to the outside of the microchip at the terminal end 1091 of the sorting flow path. In this way, the target sample is sorted by the microchip 100.

Furthermore, in the microchip 100 according to the present technology, as illustrated in FIGS. 1 to 14, the sorting flow path 109 may include a second optical detection region 1093. The second optical detection region 1093 is irradiated with light. On the basis of fluorescence and/or scattered light generated by the irradiation of light, whether or not a microparticle that should be collected has been collected may be determined. In the present embodiment, both surfaces of the substrate layer in which the second optical detection region 1093 is formed are exposed outside. This configuration enables detection by the light detection unit 303 described later. Similarly to the first optical detection region 106 described above, the second optical detection region 1093 may have a tapered shape in a part of a wall forming the region.

In the microchip 100 according to the present technology, the flow path connecting member may be inserted into at least one or more selected from a group including the sample liquid inlet 101, the terminal end 1091 of the sorting flow path 109, the sheath liquid inlet 103, the buffer liquid inlet 1101, and the terminal end 1081 of the branch flow path 108. In particular, as illustrated in FIGS. 1 to 14, flow path connecting members (for example, tubes or the like) T1 to T5 may be inserted into all of the sample liquid inlet 101, the terminal end 1091 of the sorting flow path 109, the sheath liquid inlet 103, the buffer liquid inlet 1101, and the terminal end 1081 of the branch flow path 108. As a result, for example, it is possible to prevent stagnation of a sample as compared with a case of connecting to a flow path outside the microchip via a conventional manifold. Furthermore, in this case, the microchip 100 according to the present technology may have a structure for inserting each flow path connecting member, at a side end as illustrated in FIGS. 1 to 14.

A material of the tube as the flow path connecting member may be appropriately selected by those skilled in the art from those used in the technical field. The tube may be, for example, a polyvinyl chloride (PVC) tube, a silicone tube, a polyetheretherketone (PEEK) tube, a polytetrafluoroethylene (PTFE) tube, or a thermoplastic elastomer tube, or a plurality of types of tubes may be connected.

A method for fixing each flow path connecting member is not particularly limited, and examples thereof include, for example, a method of mechanically fitting and a method of chemically bonding, but in particular, each flow path connecting member may be fixed with an adhesive. As a result, a manufacturing cost of the microchip 100 can be reduced.

Figure 19:
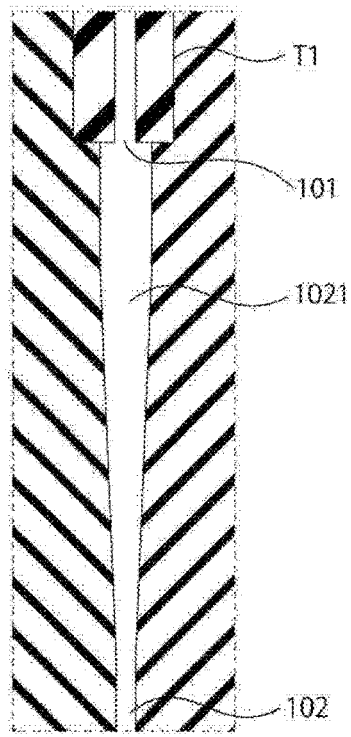
FIG. 19 is a schematic cross-sectional view illustrating an example of the vicinity of an abrupt expanding part of a sample liquid flow path.
Figure 20:
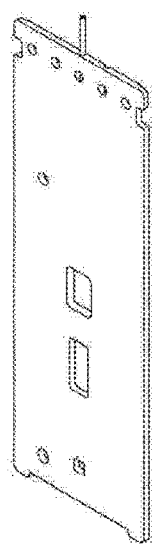
FIG. 20 is a front-side perspective view of a first layer, in which the first embodiment of the microchip according to the present technology is represented by an opaque body.
Figure 21:
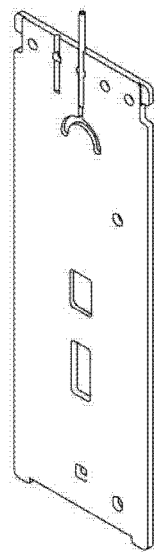
FIG. 21 is a rear-side perspective view of the first layer, in which the first embodiment of the microchip according to the present technology is represented by an opaque body.
Figure 22:
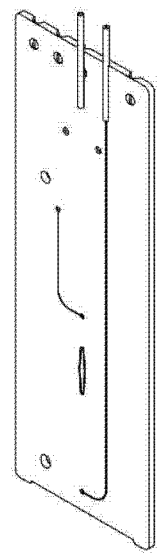
FIG. 22 is a front-side perspective view of a second layer, in which the first embodiment of the microchip according to the present technology is represented by an opaque body.
Figure 23:
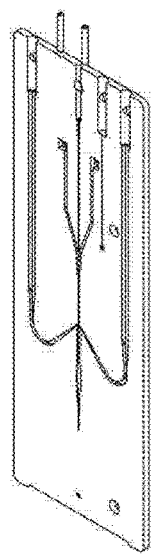
FIG. 23 is a rear-side perspective view of the second layer, in which the first embodiment of the microchip according to the present technology is represented by an opaque body.
Figure 24:
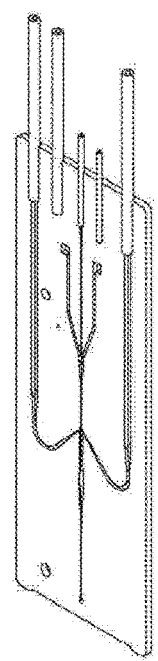
FIG. 24 is a front-side perspective view of a third layer, in which the first embodiment of the microchip according to the present technology is represented by an opaque body.
Figure 25:
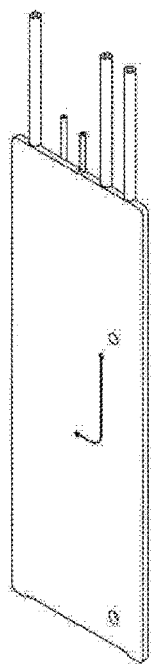
FIG. 25 is a rear-side perspective view of the third layer, in which the first embodiment of the microchip according to the present technology is represented by an opaque body.
Figure 26:
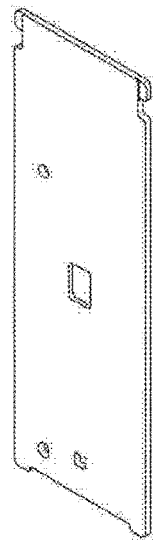
FIG. 26 is a front-side perspective view of a fourth layer, in which the first embodiment of the microchip according to the present technology is represented by an opaque body.
Figure 27:
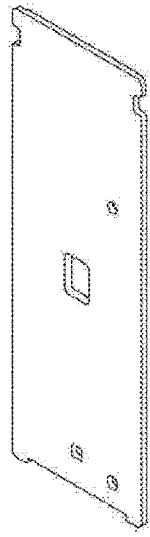
FIG. 27 is a rear-side perspective view of the fourth layer, in which the first embodiment of the microchip according to the present technology is represented by an opaque body.
Figure 28:
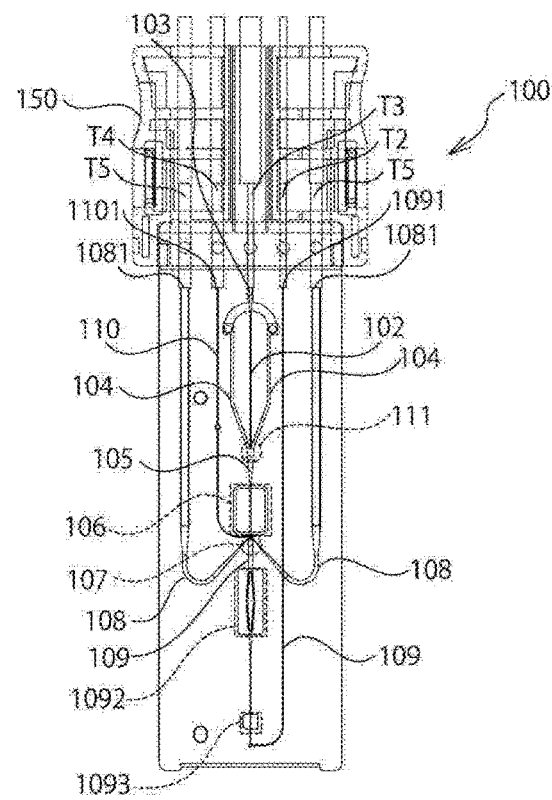
FIG. 28 is a front view illustrating a second embodiment of a microchip according to the present technology.
Figure 29:
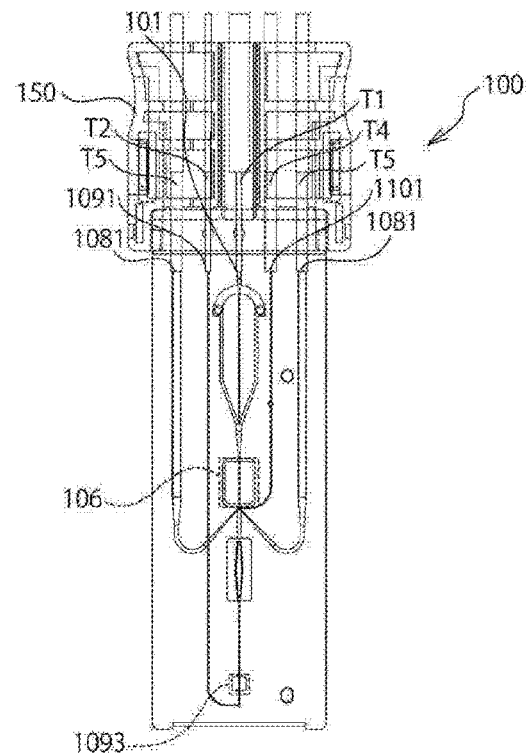
FIG. 29 is a rear view illustrating the second embodiment of the microchip according to the present technology.
Figure 30:
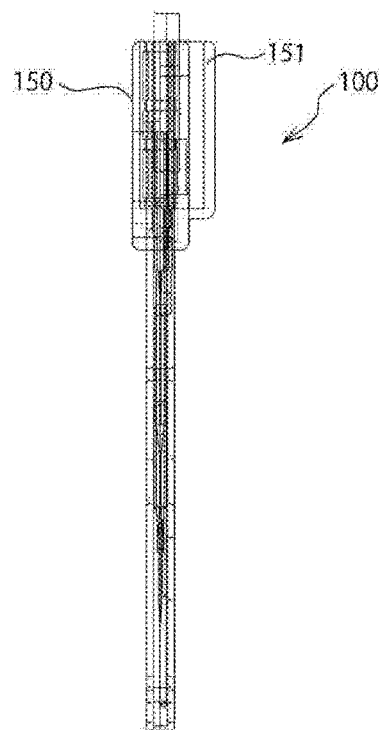
FIG. 30 is a left side view illustrating the second embodiment of the microchip according to the present technology.
Figure 31:
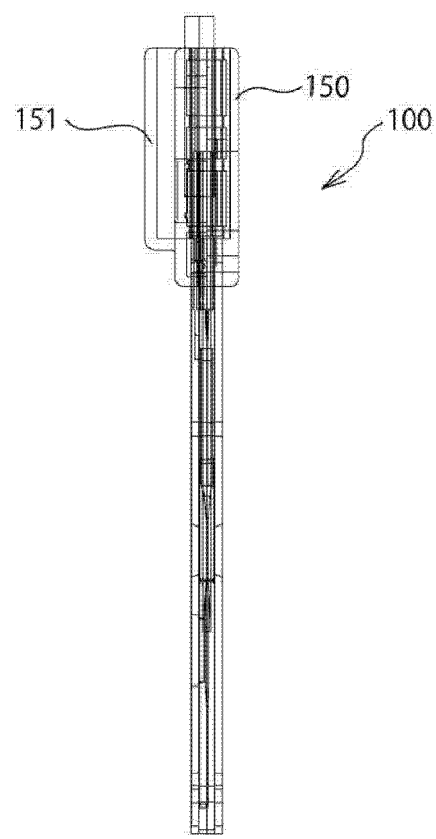
FIG. 31 is a right side view illustrating the second embodiment of the microchip according to the present technology.
Figure 32:
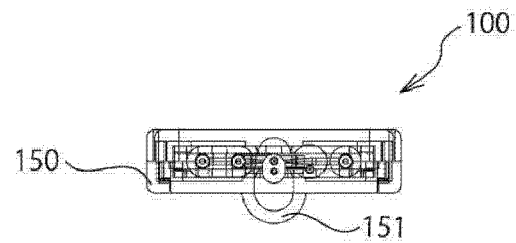
FIG. 32 is a plan view illustrating the second embodiment of the microchip according to the present technology.
Figure 33:
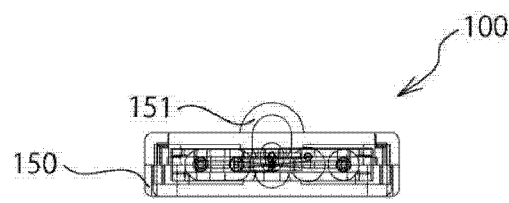
FIG. 33 is a bottom view illustrating the second embodiment of the microchip according to the present technology.
Figure 34:
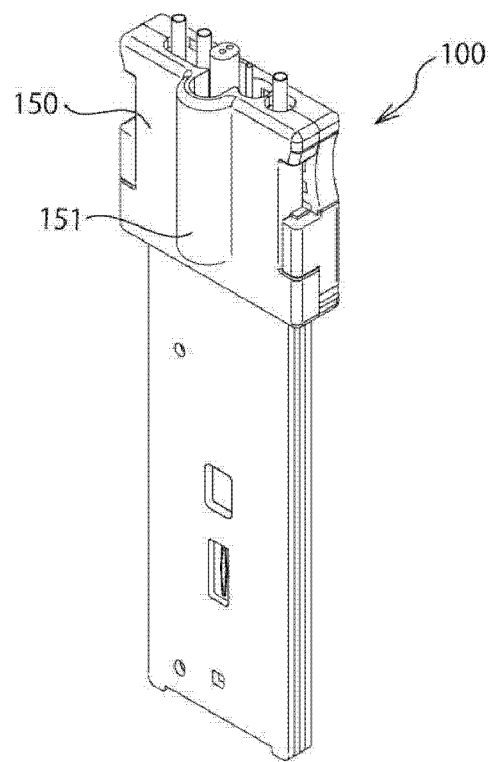
FIG. 34 is a front-side perspective view in which the second embodiment of the microchip according to the present technology is represented by an opaque body.
Figure 35:
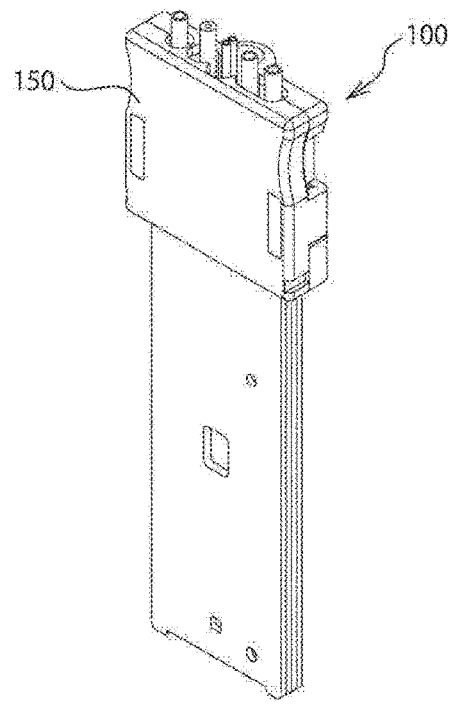
FIG. 35 is a rear-side perspective view in which the second embodiment of the microchip according to the present technology is represented by an opaque body.

In this case, in particular, as illustrated in FIG. 19, the sample liquid flow path 102 through which the sample liquid flows may have an abrupt expanding part 1021 having a cross-sectional area larger than a cross-sectional area of an inner diameter of the flow path connecting member T1, at an end on the sample liquid inlet 101 side. This is because, if the cross-sectional area of the sample liquid flow path 102 is smaller than the cross-sectional area of the inner diameter of the flow path connecting member T1, the sample stagnates at an end of the flow path connecting member T1 on the sample liquid inlet 101 side. In particular, as illustrated in FIG. 19, a shape of the abrupt expanding part 1021 may have a structure in which a width of the flow path is gradually narrowed after a width of the sample liquid inlet 101 is widened at once. This configuration makes it possible to prevent stagnation of the sample.

Furthermore, in the present technology, another flow path connecting member (for example, a tube or the like) may be further provided at an end of each flow path connecting member on a side not fixed to the microchip 100, as illustrated in a fourth embodiment to be described later. In this case, in particular, a structure may be obtained in which another flow path connecting member is further inserted into the flow path connecting members T1 to T5, a periphery thereof is fixed by, for example, an adhesive or the like, and individual flow paths are aligned in the same straight line.

In the present technology, "micro" means that at least a part of a flow path included in the microchip has a dimension on the order of μm, particularly has a cross-sectional dimension on the order of μm. That is, in the present technology, the "microchip" refers to a chip including a flow path on the order of μm, particularly a chip including a flow path having a cross-sectional dimension on the order of μm. For example, a chip including a particle sorting unit including a flow path having a cross-sectional dimension on the order of μm may be referred to as the microchip according to the present technology. For example, in the particle sorting unit 107, a cross section of a merging flow path 105 may be, for example, rectangular, and a width d of the merging flow path 105 may be, for example, 100 μm to 500 μm, and particularly 100 μm to 300 μm in the particle sorting unit 107. A width of the branch flow path 108 branching from the merging flow path 105 may be smaller than the width of the merging flow path 105. A cross section of the orifice part 130 is, for example, circular, and a diameter of the orifice part 130 at a connecting part between the orifice part 130 and the merging flow path 105 may be, for example, 10 μm to 60 μm, and particularly 20 μm to 50 μm. These dimensions regarding the flow path may be appropriately changed in accordance with a size of the microparticle, particularly a size of the target sample.

The microchip 100 according to the present technology may be manufactured by a method known in the technical field. For example, the microchip 100 can be manufactured by bonding two or more substrates on which a predetermined flow path is formed. For example, the flow path may be formed in all of two or more substrates (particularly, two substrates), or may be formed only in some substrates (particularly, one of two substrates) of two or more substrates. Furthermore, the microchip 100 may be formed by three or more substrates (particularly, four substrates) by further bonding substrates from an upper direction, a lower direction, or both directions with respect to a plane of the substrate in which the individual flow paths are formed.

As a material for forming the microchip 100, a material known in the technical field may be used. Examples thereof include, but are not limited to, for example, polycarbonate, cycloolefin polymer, polypropylene, polydimethylsiloxane (PDMS), polymethyl methacrylate (PMMA), polyethylene, polystyrene, glass, silicon, and the like. In particular, a polymer material such as, for example, polycarbonate, cycloolefin polymer, or polypropylene is particularly preferable because it is excellent in processability and a microchip can be manufactured inexpensively using a molding device.

The microchip 100 is preferably transparent as illustrated in FIGS. 1 to 14. For example, in the microchip 100, at least a portion through which light (laser light and scattered light) passes may be transparent, and for example, the particle sorting unit 107 may be transparent, but the entire microchip 100 may be transparent.

In the present technology, the "sample" contained in the sample liquid is particularly a microparticle, and the microparticle may be a particle having a dimension that enables flowing in a flow path in the microchip 100. In the present technology, the microparticle may be appropriately selected by those skilled in the art. In the present technology, the microparticles may include, for example, biological microparticles such as cells, cell masses, microorganisms, and liposomes, and synthetic microparticles such as gel particles, beads, latex particles, polymer particles, and industrial particles.

The biological microparticles (also referred to as "bioparticles") may include chromosomes, liposomes, mitochondria, organelles (cell organelles), or the like constituting various cells. The cells may include animal cells (for example, hematopoietic cells or the like) and plant cells. The cells may in particular be blood-derived cells or tissue-derived cells. The blood-derived cells may be, for example, floating cells such as T cells and B cells. The tissue-derived cells may be, for example, adherent cells separated from adherent cultured cells or tissues. The cell masses may include, for example, spheroids, organoids, or the like. The microorganisms may include bacteria such as *Escherichia coli*, viruses such as tobacco mosaic virus, fungi such as yeast, or the like. Moreover, the biological microparticles may also include biological macromolecules such as nucleic acids, proteins, and composites thereof. These biological macromolecules may be, for example, those extracted from cells, or those contained in blood samples or other liquid samples.

The synthetic microparticles may be, for example, microparticles including an organic or inorganic polymer material, metal, or the like. The organic polymer material may include polystyrene, styrene/divinylbenzene, polymethyl methacrylate, or the like. The inorganic polymer material may include glass, silica, a magnetic material, or the like. The metal may include gold colloid, aluminum, or the like. The synthetic microparticle may be, for example, a gel particle, a bead, or the like, and may be particularly a gel particle or a bead to which one or a combination of two or more selected from an oligonucleotide, a peptide, a protein, and an enzyme is bound.

A shape of the microparticle may be spherical or substantially spherical, or may be non-spherical. A size and a mass of the microparticle may be appropriately selected by those skilled in the art depending on a size of a flow path of the microchip 100. On the other hand, the size of the flow path of the microchip 100 may also be appropriately selected in accordance with the size and the mass of the microparticle. In the present technology, a chemical or biological label, for example, a fluorescent dye, a fluorescent protein, or the like may be attached to the microparticle as necessary. The label may further facilitate detection of the microparticle. The label to be attached may be appropriately selected by those skilled in the art. To the label, a molecule (for example, an antibody, an aptamer, DNA, RNA, or the like) that specifically reacts with the microparticle may bind.

In the present technology, the microparticle is preferably a biological particle, and may be a cell, in particular.

In any of the present embodiment, a second embodiment and a third embodiment described later, the microchip 100 according to the present technology described above may be distributed as the microchip 100 alone on the premise of aseptic connection, or may be distributed as one component partially connected with the sample liquid accommodation unit 201 and the like and constituting a cartridge, a unit, a device, a kit, an instrument, and the like for a closed cell sorter.

2. Second Embodiment (Microchip)

FIGS. 28 to 35 are views illustrating the second embodiment of a microchip 100 according to the present technology.

Hereinafter, a configuration of the microchip 100 according to the present embodiment will be described. Note that the embodiment illustrates a preferred example, and the microchip 100 according to the present technology is not limited to the configuration. Furthermore, in the present embodiment, a configuration other than a protection unit 150 is similar to that of the first embodiment described above.

In the present embodiment, in the microchip 100, flow path connecting members T1 to T5 are individually inserted into the sample liquid inlet 101, a terminal end 1091 of the sorting flow path 109, the sheath liquid inlet 103, the buffer liquid inlet 1101, and a terminal end 1081 of the branch flow path 108, and the protection unit 150 to protect these flow path connecting members is provided. By including the protection unit 150, for example, when the microchip 100 is inserted into and removed from a microparticle sorting device 300 described later, bending stress of the flow path connecting members T1 to T5 can be reduced. Furthermore, bending stress of a flow path connecting member that may be further connected to the flow path connecting members T1 to T5 can also be reduced.

Furthermore, as illustrated in FIGS. 28 to 35, the protection unit 150 may be provided with a recess on a part of a side surface. In particular, the recess may be on both side surfaces. As a result, the recess can function as a handle of the microchip 100.

Furthermore, the microchip 100 according to the present technology may have a mechanism to prevent reverse insertion when being inserted into a device (for example, the microparticle sorting device 300 to be described later or the like). In this case, for example, the protection unit 150 may be used as the mechanism. In particular, the protection unit 150 has a protrusion 151 on a front surface side. The protrusion 151 may be continuous in a longitudinal direction of the microchip 100. The protrusion 151 enables insertion into a chip insertion unit of the device in a case where the chip is inserted in a correct direction, but the protrusion 151 is caught by the device to prevent insertion into the chip insertion unit in a case where the chip is inserted in a wrong direction.

3. Third Embodiment (Microchip)

Figure 36:
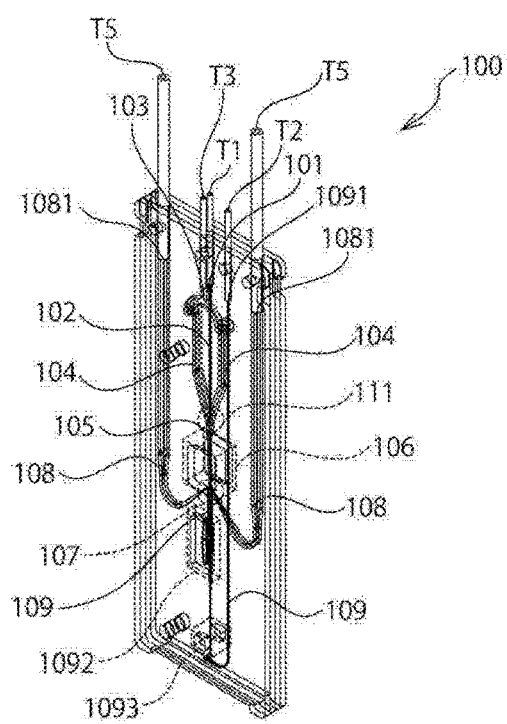
FIG. 36 is a front-side perspective view illustrating a third embodiment of a microchip according to the present technology.

FIG. 36 is a view illustrating the third embodiment of a microchip 100 according to the present technology.

Hereinafter, a configuration of the microchip 100 according to the present embodiment will be described. Note that the embodiment illustrates a preferred example, and the microchip 100 according to the present technology is not limited to the configuration. Furthermore, the present embodiment is similar to the first embodiment described above except a configuration in which the buffer liquid inlet 1101 and the buffer liquid flow path 110 are not provided as compared with the first embodiment described above.

In the present embodiment, sorting of a target sample is performed, for example, as follows.

In the microchip 100 according to the present embodiment, a sample liquid inlet 101 and a sheath liquid inlet 103 are provided on the same side surface. From these inlets, a sample liquid and a sheath liquid are introduced into a sample liquid flow path 102 and a sheath liquid flow path 104, respectively. This sample liquid contains microparticles.

The sheath liquid flowing through the sheath liquid flow path 104 joins the sample liquid flowing from both sides of the sample liquid flow path 102, to form a laminar flow in which a periphery of the sample liquid is surrounded by the sheath liquid. The laminar flow flows through a main flow path 105 toward a particle sorting unit 107.

In the particle sorting unit 107, the laminar flow having flowed through the main flow path 105 flows to a branch flow path 108. Furthermore, in the particle sorting unit 107, only in a case where a microparticle that should be collected flows, a flow to a sorting flow path 109 is formed, and the microparticle is collected. When the microparticle is suctioned into the sorting flow path 109, the sample liquid included in the laminar flow or the sample liquid and the sheath liquid included in the laminar flow may also flow into the sorting flow path 109. In this manner, the microparticles are sorted in the particle sorting unit 107.

In the present embodiment, in a case where the microparticles are collected, a flow proceeding from the main flow path 105 to the particle sorting flow path 109 through the orifice part 130 is formed. Since the buffer liquid inlet 1101 and the buffer liquid flow path 110 are not provided as compared with the first embodiment described above, sorting accuracy of the microparticles that should be collected is reduced. In the first embodiment described above, since the buffer liquid inlet 1101 and the buffer liquid flow path 110 are provided, it is possible to prevent entry of microparticles that should not be collected, into the sorting flow path 109 through the orifice part 130.

4. Fourth Embodiment (Sample Sorting Kit)

FIGS. 37 to 40 are views illustrating a configuration example of a sample sorting kit 200 according to the present technology.

Hereinafter, a configuration of the sample sorting kit 200 according to the present embodiment will be described. Note that the embodiment illustrates a preferred example, and the sample sorting kit 200 according to the present technology is not limited to the configuration. Furthermore, since a microchip 100 is similar to that described above, the description thereof is omitted here.

A sample liquid accommodation unit 201 accommodates a sample liquid containing microparticles that should be collected. In the sample sorting kit 200 according to the present technology, the sample liquid accommodation unit 201 and the microchip 100 according to the present technology are connected. In particular, the sample liquid accommodation unit 201 and the microchip 100 according to the present technology are hermetically connected.

The sample liquid accommodation unit 201 can be formed by, for example, a tubular body having a cylindrical shape with one end opened, and a lid part fitted to the tubular body and closing the opening. Then, a plurality of opening valves to accommodate the sample liquid in the tubular body is formed in the lid part, and each opening valve adopts a configuration of a check valve. Therefore, in a state where the sample liquid is accommodated in the sample liquid accommodation unit 201 via the opening valve, the sample liquid does not flow out of the sample liquid accommodation unit 201. Furthermore, the sample liquid is sealed with respect to an external atmosphere by the configuration of the opening valve.

In the present technology, the sample liquid accommodation unit 201 may include a substance that suppresses aggregation of microparticles in the sample liquid. By using the substance that suppresses aggregation of microparticles in the sample liquid, it is possible to suppress aggregation of particles in the sample liquid and to remove aggregates that are inevitably generated, in a filter unit 202 described later. Therefore, impurities in the sample liquid can be more reliably removed.

The sample liquid accommodation unit 201, and a pre-sample accommodation unit 2011, a target sample storage unit 203, a liquid discarding unit 204, a sheath liquid accommodation unit 205, and a buffer liquid accommodation unit 206 described later may be soft containers such as plastic bags, for example. The plastic bag may be, for example, a bag containing polyethylene, polypropylene, polyvinyl chloride, or ethylene vinyl acetate copolymer.

Furthermore, in the present technology, the sample liquid accommodation unit 201 and the target sample storage unit 203 to be described later may be not only the bag-shaped soft container described above but also a tube-shaped hard container such as a test tube as shown in another configuration example of FIG. 41.

Note that, in the particle sorting kit 200 according to the present technology, it is also possible to provide the pre-sample accommodation unit 2011 on upstream of the sample liquid accommodation unit 201 and to provide a substance that suppresses aggregation of microparticles in the sample liquid, in the pre-sample accommodation unit 2011.

The filter unit 202 includes at least a filter and a tapered unit, and may include, if necessary, a fitting part that fits on an outer diameter of a flow path connecting member for connection with the sample liquid accommodation unit 201 and/or the microchip 100. As a result, the microparticles in the sample liquid that have passed through the filter can be prevented from settling on an inner wall surface of the filter unit 202, and a loss amount of the microparticles can be reduced.

Figure 37:
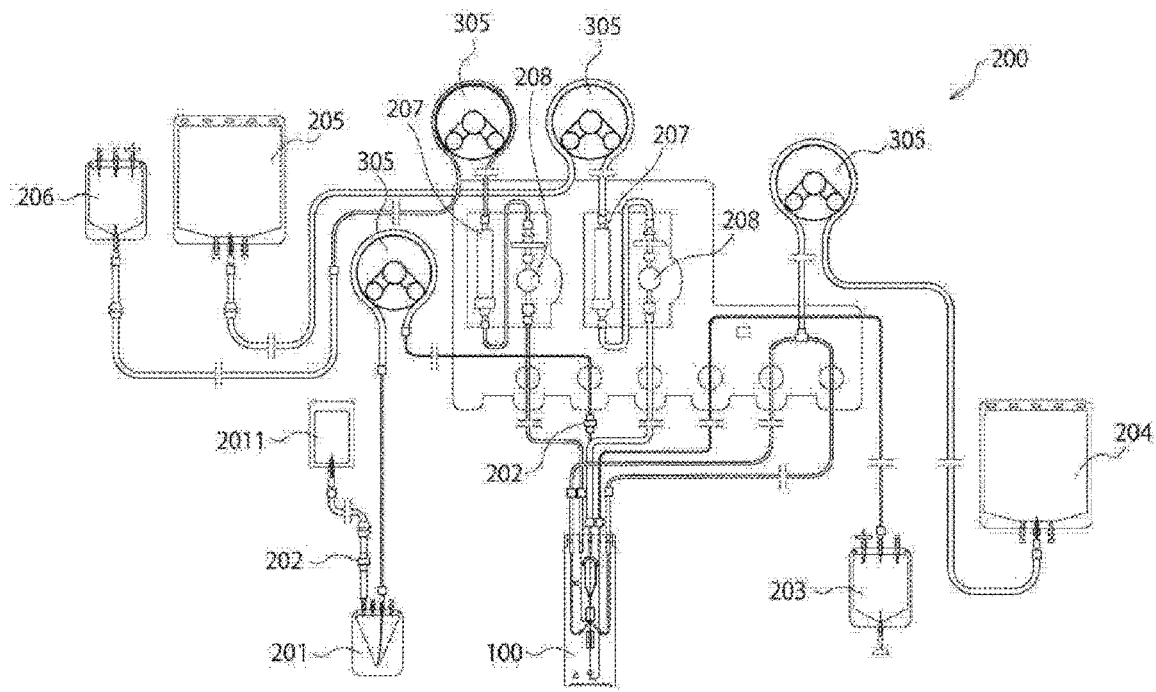
FIG. 37 is a front view illustrating a configuration example of a sample sorting kit according to the present technology.
Figure 38:
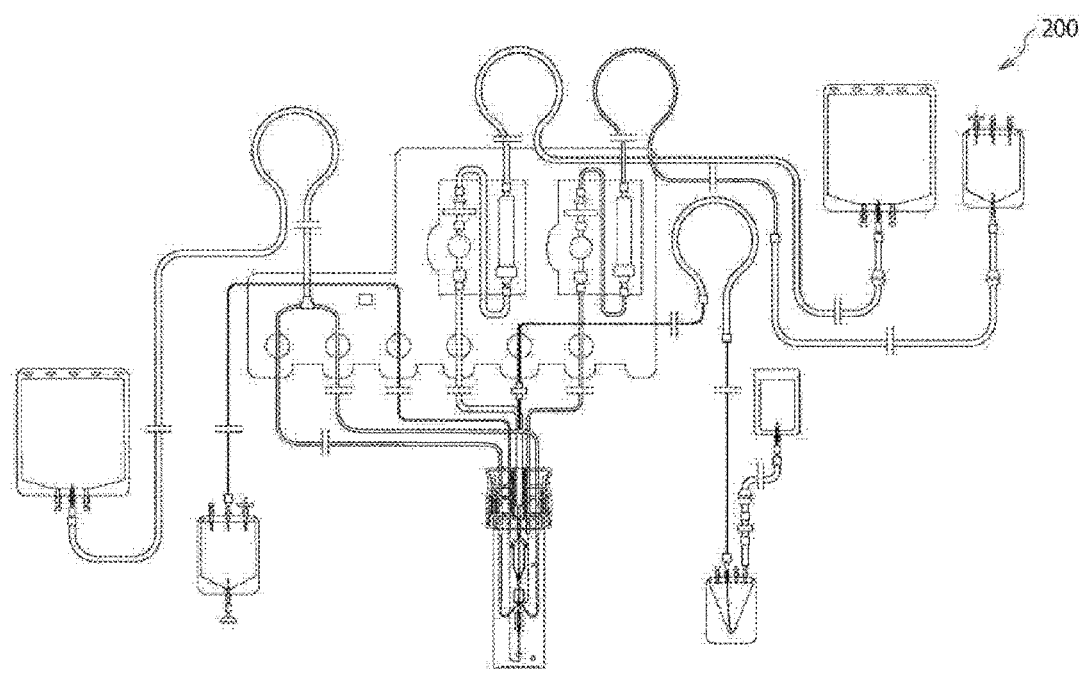
FIG. 38 is a rear view illustrating a configuration example of the sample sorting kit according to the present technology.
Figure 39:
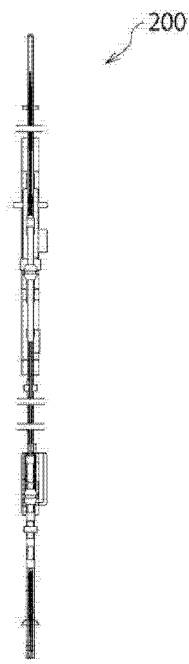
FIG. 39 is a left side view illustrating a configuration example of the sample sorting kit according to the present technology.
Figure 40:
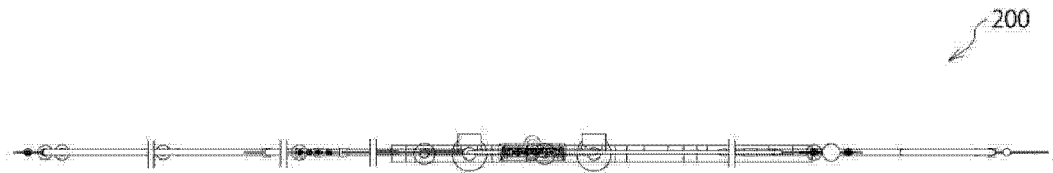
FIG. 40 is a bottom view illustrating a configuration example of the sample sorting kit according to the present technology.

The filter unit 202 can be appropriately arranged at any position by those skilled in the art, and can prevent entry of foreign matter into the sample liquid accommodation unit 201 at an initial stage by being provided on upstream of the sample liquid accommodation unit 201, for example, as illustrated in FIG. 37.

Furthermore, as illustrated in FIG. 37, the filter unit 202 may be arranged between the sample liquid accommodation unit 201 and the microchip 100. In particular, the filter unit 202 may be arranged immediately before the microchip 100. As a result, entry of foreign matter into the microchip 100 can be reliably prevented, and the accuracy of sorting of the target sample performed in the microchip 100 can be improved.

The target sample storage unit 203 accommodates microparticles that should be collected. The target sample storage unit 203 is formed in, for example, a bag shape, and includes an opening valve connected to a terminal end 1091 of a sorting flow path 109 of the microchip 100. The opening valve adopts a configuration of a so-called check valve, and the microparticle does not come out of the target sample storage unit 203 in a state where the target sample storage unit 203 accommodates the microparticle that should be collected via the opening valve. Furthermore, the configuration of the opening valve prevents the microparticles from coming into contact with an external atmosphere.

Note that the configuration of the target sample storage unit 203 described above is merely an example, and a known configuration can be adopted as long as the target sample does not contact the external atmosphere.

In the sample sorting kit 200 according to the present technology, it is necessary to exclude microparticles (hereinafter, also referred to as "non-target samples") that should not be collected at a time of extracting only the target sample from the sample liquid by the microchip 100 described above. Furthermore, since a sheath flow is formed in the microchip 100 and the target sample is sorted, it is necessary to exclude a sample liquid containing the non-target sample, a so-called waste liquid. Therefore, the sample sorting kit 200 may include the liquid discarding unit 204. The non-target sample other than the target sample may be discarded into the liquid discarding unit 204.

The liquid discarding unit 204 may include, for example, a flow path connecting member into which the waste liquid flows, and the member may communicate with a terminal end 1081 of the branch flow path 108 of the microchip 100. As a result, it is possible to sort the target sample and discard the non-target sample in a sealed space including the liquid discarding unit 204.

Furthermore, in the microchip 100, the sheath flow is formed, and the target sample is sorted from the sample liquid. Therefore, the sample sorting kit 200 may include the sheath liquid accommodation unit 205. A sheath liquid may be accommodated in the sheath liquid accommodation unit 205.

The sheath liquid accommodation unit 205 may include, for example, a flow path connecting member into which the sheath liquid flows, and the member may communicate with a sheath liquid inlet 103 of the microchip 100. As a result, the sheath liquid flows into a sheath liquid flow path 104 of the microchip 100, and the sheath flow is formed.

A configuration of the sheath liquid accommodation unit 205 is not particularly limited, and a known configuration can be adopted. Furthermore, a configuration for discharging the sheath liquid from the sheath liquid accommodation unit 205 is also not particularly limited, and for example, a drive source such as an actuator may be used.

The buffer liquid accommodation unit 206 accommodates a buffer liquid. Since the buffer liquid is similar to that described above, the description thereof is omitted here.

The buffer liquid accommodation unit 206 may include, for example, a flow path connecting member into which the buffer liquid flows, and the member may communicate with a buffer liquid inlet 1101 of the microchip 100. As a result, the buffer liquid flows into the flow path of the microchip 100, and the target sample is sorted.

A configuration of the buffer liquid accommodation unit 206 is not particularly limited, and a known configuration can be adopted. Furthermore, a configuration for discharging the buffer liquid from the buffer liquid accommodation unit 206 is also not particularly limited, and for example, a drive source such as an actuator may be used.

Figure 41:
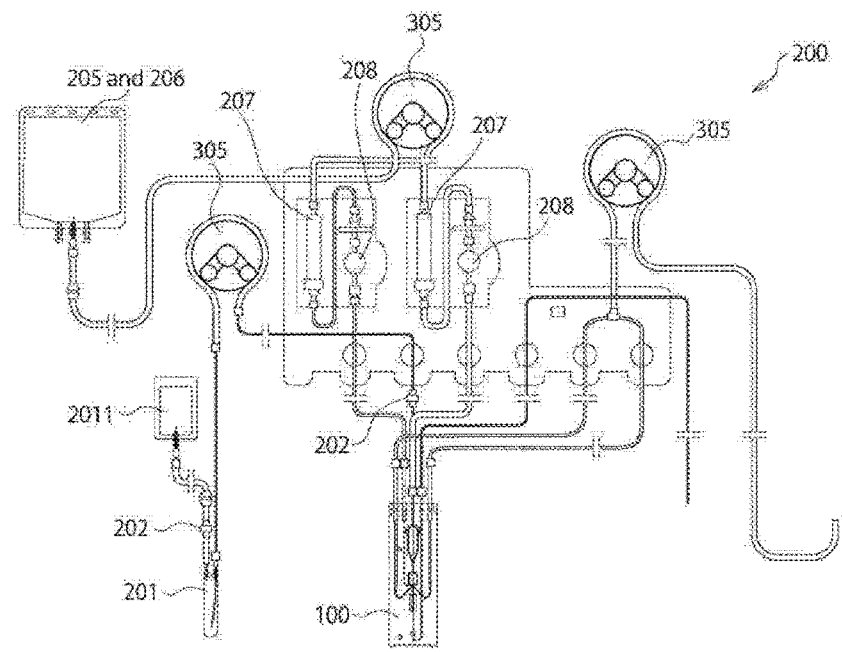
FIG. 41 is a front view illustrating another configuration example of the sample sorting kit according to the present technology.

Note that, in the present technology, as illustrated in another configuration example of FIG. 41, the sheath liquid accommodation unit 205 and the buffer liquid accommodation unit 206 may include a common accommodation unit. Specifically, for example, an embodiment may be adopted in which the sheath liquid and the buffer liquid are supplied from one reagent bag. In this case, it is not necessary to provide a sample liquid feeding mechanism 305 to be described later for each of the sheath liquid accommodation unit 205 and the buffer liquid accommodation unit 206, and it is sufficient to provide one sample liquid feeding mechanism 305 for the one reagent bag, as illustrated in FIG. 41. Furthermore, in this case, a branch may be made at the sample liquid feeding mechanism 305, and a sheath liquid amount and a buffer liquid amount may be adjusted by a flow path resistance (for example, a thickness of the microchip 100, a thickness of each flow path, or the like) in the microchip 100.

The present embodiment may include a damper 207 configured to reduce pulsation and a closed-type pressure gauge sensor 208 configured to detect a liquid feeding pressure. For example, when a part or all of the liquid in the sample sorting kit 200 is fed by a pump, a flow rate fluctuation (for example, pulsation or the like) caused by the pump may also have an influence on a flow rate in the microchip 100, in particular, a flow rate in the sorting flow path 109, and the microparticles in the particle sorting unit 107 may also have an influence on sorting. Therefore, the damper 207 may be provided to reduce the influence and to make the pressure by liquid feeding as constant as possible. Furthermore, in this case, as shown in the present embodiment, the pressure gauge sensor 208 configured to measure a pressure may be provided for each damper 207. This configuration makes it possible to stably feed the liquid to each part. The damper 207 and the pressure gauge sensor 208 may be particularly arranged downstream of the sheath liquid accommodation unit 205 and/or the buffer liquid accommodation unit 206, and between with the microchip 100. Note that, in the present technology, the damper 207 and the pressure gauge sensor 208 are not necessarily provided together, and any one of them may be provided.

In the present embodiment, as illustrated in FIGS. 37 to 41, the sample sorting kit 200 may include the damper 207, the pressure gauge sensor 208, and a part of the flow path connecting member, in a plate-shaped structure. The plate-shaped structure may be appropriately selected by those skilled in the art from structures adopted in the technical field. As a material for forming the plate-shaped structure, a material known in the technical field may be used. Examples thereof include, but are not limited to, for example, polycarbonate, cycloolefin polymer, polypropylene, polydimethylsiloxane (PDMS), polymethyl methacrylate (PMMA), polyethylene, polystyrene, glass, silicon, and the like.

The individual units of the sample sorting kit 200 according to the present technology, including the microchip 100, may be all connected from the beginning as illustrated in FIGS. 37 to 40, or may be configured such that a part thereof is aseptically connected later as illustrated in FIG. 41. As a method of aseptically connecting later, it can be performed by using a sterile welder, an aseptic connection connector, or the like.

By using the sample sorting kit 200 according to the present technology, sorting of a target sample and storage of the target sample can be executed in a sealed space, and sorting accuracy of the target sample can be improved. Furthermore, it is possible to prevent contamination of the sample sorting kit itself by mist including the target sample and/or mixing of other substances into the sorted target sample. Therefore, the sample sorting kit 200 according to the present technology can also be applied to clinical applications such as immune cell therapy in which purity of a target sample is required.

Furthermore, the sample sorting kit 200 itself can be made disposable, and risk of contamination between samples and the like can be avoided and usability is improved.

Moreover, the sample sorting kit 200 may have a structure that engages with an attachment part on a device side when attached to the microparticle sorting device 300 described later or the like. Examples include, for example, providing a hook on the device side and providing a hole to be engaged with the hook at a corner or the like on the kit side, and the like, but the structure may be appropriately selected by those skilled in the art from structures adopted in the technical field.

A plurality of pieces of each unit of the sample sorting kit 200 described above may be provided. For example, although not illustrated, the microchip 100 can be further provided downstream of the target sample storage unit 203, and the target sample sorted from the sample liquid can be further sorted.

5. Fifth Embodiment (Microparticle Sorting Device)

Figure 42:
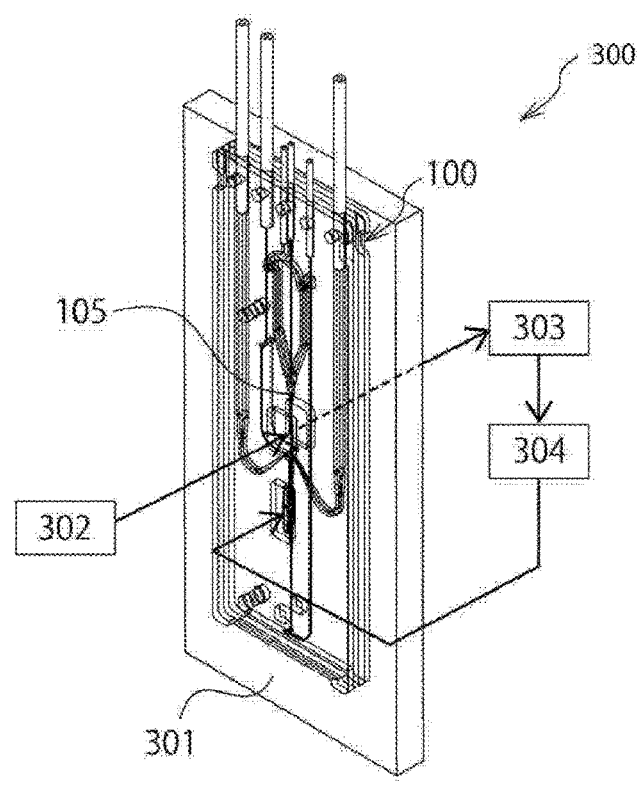
FIG. 42 is a view illustrating a configuration example of a microparticle sorting device according to the present technology.

FIG. 42 is a view illustrating a configuration example of a microparticle sorting device 300.

Hereinafter, a configuration of the microparticle sorting device 300 according to the present embodiment will be described. Note that the embodiment illustrates a preferred example, and the microparticle sorting device 300 according to the present technology is not limited to the configuration. Furthermore, since a microchip 100 and a sample sorting kit 200 are similar to those described above, the description thereof is omitted here.

The microchip 100 described above is mounted on the microparticle sorting device 300 according to the present technology. Furthermore, as illustrated in FIG. 42, a chip insertion unit 301 into which the microchip 100 is inserted may be provided. The chip insertion unit 301 may be appropriately selected by those skilled in the art from structures adopted in the technical field as long as the structure allows a chip to be inserted.

The chip insertion unit 301 may have a load presence sensor that reacts only when the microchip 100 is inserted in a correct direction. In a case where the load presence sensor reacts, the chip insertion unit 301 may automatically sandwich the microchip 100 in an insertion direction. This configuration makes it possible to prevent reverse insertion of the chip.

Furthermore, in a case where the microchip 100 includes a protection unit 150, a part of the chip insertion unit 301 may be engaged with a part of the protection unit 150 to temporarily position the chip. For example, a recess is provided at an end of the protection unit 150, and the recess is engaged with a ball plunger on the chip insertion unit 301 side to prevent the chip from coming off. As a result, it is possible to give a click feeling to a user to notify of completion of the insertion of the chip, and it is possible to prevent the chip from coming off from the chip insertion unit 301 due to tension applied to a flow path connecting member.

In the present embodiment, the microparticle sorting device 300 may include: a light irradiation unit 302 configured to irradiate a microparticle flowing through the first optical detection region 106 in the microchip 100 with light; and a light detection unit 303 configured to detect scattered light and/or fluorescence generated by the light irradiation. Furthermore, the light detection unit 304 may irradiate a second optical detection region 1093 in the microchip 100 with light.

Furthermore, the microparticle sorting device 300 may include a control unit 304. The control unit 304 controls a traveling direction of the microparticle flowing through a main flow path 105 on the basis of data (for example, information regarding light, or the like) detected by the light detection unit 303.

Hereinafter, the light irradiation unit 302, the light detection unit 303, and the control unit 304 will be described.

The light irradiation unit 302 irradiates the microparticle flowing through the first optical detection region 106 in the microchip 100 with light (for example, excitation light or the like). The light irradiation unit 302 may include a light source that emits light and an objective lens that condenses excitation light on the microparticle flowing in a detection region. The light source may be appropriately selected by those skilled in the art in accordance with a purpose of sorting, and may be, for example, a laser diode, a SHG laser, a solid-state laser, a gas laser, or a high-intensity LED, or a combination of two or more thereof. The light irradiation unit 302 may include other optical elements as necessary in addition to the light source and the objective lens. For example, the light irradiation unit 302 may irradiate one position in the first optical detection region 106 with light, or may irradiate each of a plurality of positions with light. For example, the light irradiation unit 302 may irradiate each of two different positions in the first optical detection region 106 with light.

The light detection unit 303 detects scattered light and/or fluorescence generated from the microparticles by irradiation with the light irradiation unit 302. The light detection unit 303 may include a condenser lens that condenses fluorescence and/or scattered light generated from the microparticle, and a detector. As the detector, a PMT, a photodiode, a CCD, a CMOS, or the like may be used, but the detector is not limited thereto. The light detection unit 303 may include other optical elements as necessary in addition to the condenser lens and the detector. The light detection unit 303 may further include, for example, a spectroscopic unit. Examples of an optical component constituting the spectroscopic unit include, for example, a grating, a prism, and an optical filter. The spectroscopic unit can detect, for example, light having a wavelength that should be detected separately from light having other wavelength.

The fluorescence detected by the light detection unit 303 may be fluorescence generated from the microparticle itself and fluorescence generated from a substance labeled in the microparticle, for example, a fluorescent substance or the like, but is not limited thereto. The scattered light detected by the light detection unit 303 may be forward scattered light, side scattered light, Rayleigh scattering, Mie scattering, or a combination thereof.

The control unit 304 controls a traveling direction of the microparticle flowing through the main flow path 105 on the basis of data (for example, information regarding light, or the like) detected by the light detection unit 303. For example, the control unit 304 controls sorting of the microparticle on the basis of the data. For example, in a case where light detected by the light detection unit 303 satisfies a predetermined standard, the control unit 304 may determine to sort the microparticle. From the light (fluorescence and/or scattered light) detected by the light detection unit 303, information regarding the light may be generated. The information may be generated, for example, by converting the light into an electric signal. In order to generate the information, the microparticle sorting device 300 of the present technology may include an information generation unit configured to generate, from light detected by the light detection unit 303, information regarding the light. The information generation unit may be included in the control unit 304, or may be provided in the microparticle sorting device 300 as a component different from the control unit 304 without being included in the control unit 304. The control unit 304 may determine whether or not the light detected by the light detection unit 303 satisfies a predetermined standard on the basis of the information regarding the light. The control unit 304 may control sorting of microparticles on the basis of a result of the determination.

In a case where the microparticle should be collected on the basis of a result of the determination, the control unit 304 may change a flow in a flow path so that the microparticle travels through an orifice into a sorting flow path 109. The flow may be changed, for example, by reducing a pressure in the sorting flow path 109. Furthermore, after collecting the microparticle, the control unit 304 may change the flow in the flow path again. The flow may be changed again by increasing the pressure in the particle sorting flow path. That is, the control unit 304 may control the pressure in the particle sorting flow path on the basis of the information regarding the light detected by the light detection unit 303.

The control unit 304 may have a function similar to that of the drive unit described in Japanese Patent Application Laid-Open No. 2014 036604, for example. That is, the control unit 304 may control an actuator configured to generate a negative pressure in the sorting flow path 109. In a case where it is determined that the microparticle should be collected on the basis of the information regarding the light, the control unit 304 drives the actuator to generate a negative pressure in the sorting flow path 109. As a result, the microparticle that should be collected is collected in the sorting flow path 109. In a case where it is determined that the microparticle should not be collected on the basis of the information regarding the light, the control unit 304 does not drive the actuator. As a result, the microparticle that should not be collected flows into the branch flow path 108.

The actuator may be, for example, a piezoelectric element such as a piezo element. In a case where it is determined that the microparticle should be collected, the control unit 304 applies a voltage that becomes piezoelectric contraction to the piezo element, to increase a volume in the sorting flow path 109. As the volume increases, a negative pressure is generated in the sorting flow path 109. As a result, a flow from the main flow path 105 to the sorting flow path 109 is formed, and the microparticle is collected into the sorting flow path 109. In a case where it is determined that the microparticle should not be collected, the voltage is not applied. As a result, the flow into the sorting flow path 109 is not formed, and the microparticle flows to the branch flow path 108.

In the present embodiment, the microparticle sorting device 300 may include the sample sorting kit 200 described above. In this case, as illustrated in FIG. 42, the microparticle sorting device 300 may include a sample liquid feeding mechanism 305 configured to feed a sample from the sample liquid accommodation unit 201 to the microchip 100. The sample liquid feeding mechanism 305 may be a pump, in particular. Furthermore, in particular, the sample liquid feeding mechanism 305 may be arranged downstream of a sample accommodation unit 201 and between with the microchip 100.

The pump may be, for example, a peristaltic pump (tube pump), a roller pump, a syringe pump using an air pressure source as a compressor, or a centrifugal pump, but is not limited thereto. The pump may be a peristaltic pump or a roller pump, in particular, for more precise control of a flow rate.

Furthermore, as illustrated in FIG. 37, a plurality of the sample liquid feeding mechanisms 305 may be provided. Furthermore, the sample liquid feeding mechanism 305 may be further arranged downstream of the microchip 100 and between with a liquid discarding unit 204, downstream of a sheath liquid accommodation unit 205 and between with the microchip 100, or downstream of a buffer liquid accommodation unit 206 and between with the microchip 100.

Moreover, in the present embodiment, the microparticle sorting device 300 may have a plurality of attachment parts to which individual units of the sample sorting kit 200 can be attached. A structure of the attachment part may be appropriately selected by those skilled in the art from structures adopted in the technical field.

Furthermore, as described above, in a case where the sample liquid accommodation unit 201 is a tube-shaped hard container as illustrated in FIG. 41, in the present technology, the tube-shaped hard container may be fixed to a plate having a hole, for example, and stirred while being vibrated with XY Stage, and the hard container may be cooled. In this case, the cooling may be performed not only on the sample liquid accommodation unit 201 but also on a target sample storage unit 203. Examples of a cooling method include, for example, a method of putting the sample liquid accommodation unit 201 and the target sample storage unit 203 in a refrigerator, a method of bringing the sample liquid accommodation unit 201 and the target sample storage unit 203 into contact with a cooling element such as a Peltier element, and the like. Note that the cooling mechanisms of the sample liquid accommodation unit 201 and the target sample storage unit 203 may be individually controlled or may be under the same control.

Figure 43:
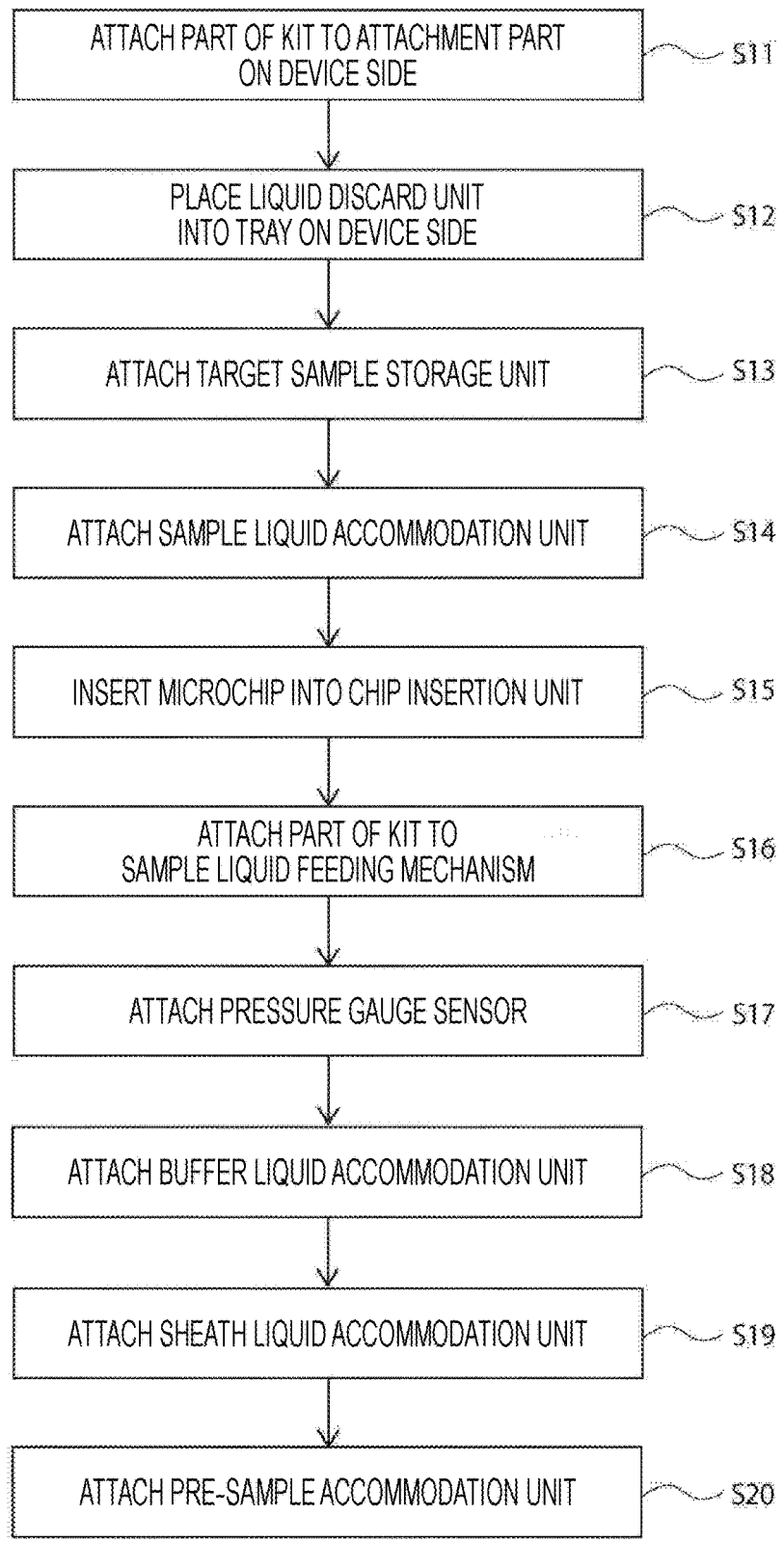
FIG. 43 is a flowchart showing an example when the sample sorting kit is attached to the microparticle sorting device.

FIG. 43 is a flowchart illustrating an example when the sample sorting kit 200 is attached to the microparticle sorting device 300 of the present embodiment.

Hereinafter, a flow when the sample sorting kit 200 is attached to the microparticle sorting device 300 according to the present embodiment will be described. Note that this flow shows a preferred example, and the attachment of the sample sorting kit 200 to the microparticle sorting device 300 is not limited to this flow.

First, a part (for example, a part of the plate-shaped structure, and the like) of the sample sorting kit 200 is attached to an attachment part (for example, a hook or the like) on the device side (S11). Next, the liquid discarding unit 204 is placed into a tray on the device side (S12). Next, the target sample storage unit 203 is attached to the attachment part on the device side (S13). Next, the sample liquid accommodation unit 201 is attached to the attachment part on the device side (S14). Next, the microchip 100 in the sample sorting kit 200 is inserted into the chip insertion unit 301 (S15). Next, a part (for example, a part of a flow path connecting member, or the like) of the sample sorting kit 200 is attached to the sample liquid feeding mechanism 305 (S16). Next, the pressure gauge sensor 208 is attached to the attachment part on the device side (S17). Next, the buffer liquid accommodation unit 206 is attached to the attachment part on the device side (S18). Next, the sheath liquid accommodation unit 205 is attached to the attachment part on the device side (S19). Finally, the pre-sample accommodation unit 2011 is attached to the attachment part on the device side (S20).

Note that the present technology may have the following configurations.

[1]
A microchip having a plate shape and including:
a sample liquid inlet into which a sample liquid is introduced;
a main flow path through which the sample liquid introduced from the sample liquid inlet flows; and
a sorting flow path into which a target sample is sorted from the sample liquid, in which
the sample liquid inlet and a terminal end of the sorting flow path are formed on a same side surface.

[2]
The microchip according to [1], further including:
a sheath liquid inlet into which a sheath liquid is introduced, in which
the sheath liquid inlet is formed on the same side surface.

[3]
The microchip according to [2], further including:
a buffer liquid inlet into which a buffer liquid is introduced, in which
the buffer liquid inlet is formed on the same side surface.

[4]
The microchip according to [3], further including:
a branch flow path that branches from the main flow path and into which a sample other than a target sample is discarded, in which
a terminal end of the branch flow path is formed on the same side surface.

[5]
The microchip according to [4], in which a flow path connecting member is inserted into at least one or more selected from a group including the sample liquid inlet, the terminal end of the sorting flow path, the sheath liquid inlet, the buffer liquid inlet, and the terminal end of the branch flow path.

[6]
The microchip according to [5], further including a protection unit that protects the inserted flow path connecting member.

[7]
The microchip according to [5] or [6], in which a sample liquid flow path through which the sample liquid flows has an abrupt expanding part having a cross-sectional area larger than a cross-sectional area of an inner diameter of the flow path connecting member, at an end on the sample liquid inlet side.

[8]
The microchip according to any one of [1] to [7], further including:
an orifice part coaxial with the main flow path and connected to the sorting flow path, in which
a side wall of the sorting flow path on a side connected to the orifice part has at least one or more curvatures.

[9]
The microchip according to [8], in which a cross-sectional area of the sorting flow path continuously increases along a traveling direction of a liquid flow up to a predetermined position.

[10]
The microchip according to [9], in which a side wall of the sorting flow path on a side connected to the orifice part has two different curvatures.

[11]
The macrochip according to [10], in which a depth of the sorting flow path is constant up to a second curvature portion, and a width up to the two curvature portions continuously increases along a traveling direction of a liquid flow.

[12]
The microchip according to [11], in which a depth of the sorting flow path continuously increases along a traveling direction of a liquid flow up to a predetermined position after the second curvature portion.

[13]
The microchip according to any one of [8] to [12], in which
the sorting flow path and the orifice part are formed in a substrate layer that is laminated, and
a part of the sorting flow path and/or a part of the orifice part are formed in a layer on one side of the substrate layer.

[14]
The microchip according to any one of [1] to [13], in which at least a part of one surface of the substrate layer in which the sorting flow path is formed is exposed outside.

[15]
The microchip according to any one of [1] to [14], in which
the main flow path has a first optical detection region, and
both surfaces of the substrate layer in which the first optical detection region is formed are exposed outside.

[16]
The microchip according to any one of [1] to [15], in which
the sorting flow path has a second optical detection region, and
both surfaces of the substrate layer in which the second optical detection region is formed are exposed outside.

[17]
A sample sorting kit including:
a sample liquid accommodation unit that accommodates a sample liquid; and
a microchip having a plate shape and including a sample liquid inlet into which a sample liquid is introduced, a main flow path through which the sample liquid introduced from the sample liquid inlet flows, and a sorting flow path into which a target sample is sorted from the sample liquid, in which the sample liquid inlet and a terminal end of the sorting flow path are formed on a same side surface, in which
the sample liquid accommodation unit and the microchip are connected.

[18]
A microparticle sorting device including a microchip having a plate shape, the microchip including: a sample liquid inlet into which a sample liquid is introduced; a main flow path through which the sample liquid introduced from the sample liquid inlet flows; and a sorting flow path into which a target sample is sorted from the sample liquid, in which the sample liquid inlet and a terminal end of the sorting flow path are formed on a same side surface.

[19]
The microparticle sorting device according to [18], further including:
a chip insertion unit into which the microchip is inserted;
a light irradiation unit configured to irradiate a microparticle flowing through the main flow path with light;
a light detection unit configured to detect scattered light and/or fluorescence emitted from the microparticle; and

a control unit configured to control a traveling direction of a microparticle flowing through the main flow path on the basis of data detected by the light detection unit.

[20]

The microparticle sorting device according to [18] or [19], further including: a sample liquid accommodation unit that accommodates the sample liquid; and a sample sorting kit in which the sample liquid accommodation unit and the microchip are connected, the microparticle sorting device further including a sample liquid feeding mechanism configured to feed a sample from the sample liquid accommodation unit to the microchip.

REFERENCE SIGNS LIST

100 Microchip
101 Sample liquid inlet
102 Sample liquid flow path
1021 Abrupt expanding part
103 Sheath liquid inlet
104 Sheath liquid flow path
105 Main flow path
106 First optical detection region
107 Particle sorting unit
108 Branch flow path
1081 Terminal end of branch flow path 108
109 Sorting flow path
1091 Terminal end of sorting flow path 109
1092 Excitation region
1093 Second optical detection region
110 Buffer liquid flow path
1101 Buffer liquid inlet
111 Merging part
120, 130 Orifice part
150 Protection unit
151 Protrusion
d Width of merging flow path
T1 to T5 Flow path connecting member
200 Sample sorting kit
201 Sample liquid accommodation unit
2011 Pre-sample accommodation unit
202 Filter unit
203 Target sample storage unit
204 liquid discarding unit
205 Sheath liquid accommodation unit
206 Buffer liquid accommodation unit
207 Damper
208 Pressure gauge sensor
300 Microparticle sorting device
301 Chip insertion unit
302 Light irradiation unit
303 Light detection unit
304 Control unit
305 Sample liquid feeding mechanism

The invention claimed is:

1. A microchip having a plate shape and comprising:
a sample liquid inlet into which a sample liquid is introduced;
a main flow path through which the sample liquid introduced from the sample liquid inlet flows;
a sorting flow path into which a target sample is sorted from the sample liquid, wherein the sample liquid inlet and a terminal end of the sorting flow path are formed on a same side surface; and
an orifice part coaxial with the main flow path and connected to the sorting flow path,
wherein a cross-sectional area of the sorting flow path continuously increases along a traveling direction of a liquid flow up to a predetermined position, and
wherein a side wall of the sorting flow path on a side connected to the orifice part has two different curvatures.

2. The microchip according to claim 1, further comprising:
a sheath liquid inlet into which a sheath liquid is introduced, wherein
the sheath liquid inlet is formed on the same side surface.

3. The microchip according to claim 2, further comprising:
a buffer liquid inlet into which a buffer liquid is introduced, wherein
the buffer liquid inlet is formed on the same side surface.

4. The microchip according to claim 3, further comprising:
a branch flow path that branches from the main flow path and into which a sample other than a target sample is discarded, wherein
a terminal end of the branch flow path is formed on the same side surface.

5. The microchip according to claim 4, wherein a flow path connecting member is inserted into at least one of the sample liquid inlet, the terminal end of the sorting flow path, the sheath liquid inlet, the buffer liquid inlet, and the terminal end of the branch flow path.

6. The microchip according to claim 5, further comprising a protection unit that protects the inserted flow path connecting member.

7. The microchip according to claim 5, wherein the main flow path through which the sample liquid flows has an expanding part having a cross-sectional area larger than a cross-sectional area of an inner diameter of the flow path connecting member, at an end on the sample liquid inlet side.

8. The microchip according to claim 1, wherein a depth of the sorting flow path is constant up to a second curvature portion, and a width up to the second curvature portion continuously increases along a traveling direction of a liquid flow.

9. The microchip according to claim 8, wherein a depth of the sorting flow path continuously increases along a traveling direction of a liquid flow after the second curvature portion.

10. The microchip according to claim 1, wherein
the sorting flow path and the orifice part are formed in a substrate layer that is laminated, and
a part of the sorting flow path and/or a part of the orifice part are formed in a layer on one side of the substrate layer.

11. The microchip according to claim 1, wherein at least a part of one surface of a substrate layer in which the sorting flow path is formed is exposed outside.

12. The microchip according to claim 1, wherein
the main flow path has a first optical detection region, and
both surfaces of a substrate layer in which the first optical detection region is formed are exposed outside.

13. The microchip according to claim 1, wherein
the sorting flow path has a second optical detection region, and
both surfaces of a substrate layer in which the second optical detection region is formed are exposed outside.

14. A sample sorting kit comprising:
a sample liquid accommodation unit that accommodates a sample liquid; and a microchip having a plate shape and including
  a sample liquid inlet into which a sample liquid is introduced,
  a main flow path through which the sample liquid introduced from the sample liquid inlet flows,
  a sorting flow path into which a target sample is sorted from the sample liquid, wherein the sample liquid inlet and a terminal end of the sorting flow path are formed on a same side surface, wherein the sample liquid accommodation unit and the microchip are connected, and
  an orifice part coaxial with the main flow path and connected to the sorting flow path,
  wherein a cross-sectional area of the sorting flow path continuously increases along a traveling direction of a liquid flow up to a predetermined position, and
  wherein a side wall of the sorting flow path on a side connected to the orifice part has two different curvatures.

15. A microparticle sorting device comprising a microchip having a plate shape, the microchip including:
  a sample liquid inlet into which a sample liquid is introduced;
  a main flow path through which the sample liquid introduced from the sample liquid inlet flows;
  a sorting flow path into which a target sample is sorted from the sample liquid, wherein the sample liquid inlet and a terminal end of the sorting flow path are formed on a same side surface, and
  an orifice part coaxial with the main flow path and connected to the sorting flow path,
  wherein a cross-sectional area of the sorting flow path continuously increases along a traveling direction of a liquid flow up to a predetermined position, and
  wherein a side wall of the sorting flow path on a side connected to the orifice part has two different curvatures.

16. The microparticle sorting device according to claim 15, further comprising:
  a chip insertion unit into which the microchip is inserted;
  a light irradiation unit configured to irradiate a microparticle flowing through the main flow path with light;
  a light detection unit configured to detect scattered light and/or fluorescence emitted from the microparticle; and
  a control unit configured to control a traveling direction of a microparticle flowing through the main flow path on a basis of data detected by the light detection unit.

17. The microparticle sorting device according to claim 15, further comprising: a sample liquid accommodation unit that accommodates the sample liquid; and a sample sorting kit in which the sample liquid accommodation unit and the microchip are connected, the microparticle sorting device further comprising a sample liquid feeding mechanism configured to feed a sample from the sample liquid accommodation unit to the microchip.

* * * * *